(12) United States Patent
McChord et al.

(10) Patent No.: US 9,836,347 B2
(45) Date of Patent: *Dec. 5, 2017

(54) APPARATUSES, METHODS AND SYSTEMS FOR DETERMINING A VIRTUAL MACHINE STATE

(71) Applicant: Datto, Inc., Norwalk, CT (US)

(72) Inventors: Austin McChord, Norwalk, CT (US); Matthew Coleman, Guilford, CT (US)

(73) Assignee: Datto, Inc., Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,397

(22) Filed: Mar. 30, 2016

(65) Prior Publication Data

US 2016/0350169 A1    Dec. 1, 2016

Related U.S. Application Data

(63) Continuation of application No. 14/702,397, filed on May 1, 2015, now Pat. No. 9,323,638, which is a
(Continued)

(51) Int. Cl.
*G06F 11/07* (2006.01)
*G06F 11/32* (2006.01)
(Continued)

(52) U.S. Cl.
CPC ........ *G06F 11/079* (2013.01); *G06F 9/45558* (2013.01); *G06F 11/0712* (2013.01);
(Continued)

(58) Field of Classification Search
CPC .. G06F 11/0712; G06F 11/22; G06F 11/2247; G06F 11/2289; G06F 11/2284;
(Continued)

(56) References Cited

U.S. PATENT DOCUMENTS 5,379,342 A    1/1995   Arnold et al.
5,835,953 A   11/1998   Ohran
(Continued)

OTHER PUBLICATIONS

Carrier, "File System Forensic Analysis", 2005, Addison Wesley, ISBN-13 978-0-321-26817-4.
(Continued)

*Primary Examiner* — Joseph D Manoskey
(74) *Attorney, Agent, or Firm* — Wilmer Cutler Pickering Hale and Dorr LLP

(57) ABSTRACT

APPARATUSES, METHODS AND SYSTEMS FOR DETERMINING A VIRTUAL MACHINE STATE ("CRV") (transforms register retrieval requests, via CRV components, into boot success messages and screenshot capture command invocation outputs. A method comprises determining when to capture a screenshot of a virtual machine's display output by observing the values of a virtual CPU's registers, or the entropy of the virtual CPU's register values, obtained from a hypervisor in communication with the virtual machine's virtual CPU. The method further comprises determining when the virtual machine is at a boot success state and capturing a screenshot of the virtual machine display output.

68 Claims, 11 Drawing Sheets

Example: CPU Register Assisted Screenshot Verification

Related U.S. Application Data continuation of application No. 14/456,981, filed on Aug. 11, 2014, now Pat. No. 9,053,216.

(60) Provisional application No. 61/864,358, filed on Aug. 9, 2013.

(51) Int. Cl.
  *G06F 11/22* (2006.01)
  *G06F 11/30* (2006.01)
  *G06F 11/34* (2006.01)
  *G06F 9/455* (2006.01)
  *G06F 11/14* (2006.01)

(52) U.S. Cl.
  CPC ...... *G06F 11/0751* (2013.01); *G06F 11/0772* (2013.01); *G06F 11/1484* (2013.01); *G06F 11/2284* (2013.01); *G06F 11/301* (2013.01); *G06F 11/302* (2013.01); *G06F 11/3024* (2013.01); *G06F 11/3055* (2013.01); *G06F 11/324* (2013.01); *G06F 11/327* (2013.01); *G06F 11/3476* (2013.01); *G06F 11/1458* (2013.01); *G06F 11/1461* (2013.01); *G06F 2201/815* (2013.01); *Y02B 60/165* (2013.01)

(58) Field of Classification Search
  CPC ...... G06F 11/261; G06F 11/26; G06F 11/301; G06F 11/3065; G06F 11/3086; G06F 11/32; G06F 11/321; G06F 11/324; G06F 11/327; G06F 11/328; G06F 11/3055; G06F 11/1484; G06F 2201/815; G06F 9/45558; Y02B 60/165
  USPC ............ 714/57, 25, 28, 29, 33, 36, 37, 38.1, 714/38.11, 38.12, 41, 46
  See application file for complete search history.

(56) References Cited

U.S. PATENT DOCUMENTS

| | | | |
|---|---|---|---|
| 6,032,266 A | 2/2000 | Ichinohe et al. | |
| 6,065,073 A | 5/2000 | Booth | |
| 6,185,666 B1 | 2/2001 | Murray et al. | |
| 6,415,300 B1 | 7/2002 | Liu | |
| 6,691,245 B1 | 2/2004 | DeKoning | |
| 6,981,007 B1 | 12/2005 | Whitmyer, Jr. | |
| 7,024,555 B2 | 4/2006 | Kozuch et al. | |
| 7,174,352 B2 | 2/2007 | Kleiman et al. | |
| 7,296,125 B2 | 11/2007 | Ohran | |
| 7,370,233 B1 | 5/2008 | Sobel et al. | |
| 7,694,121 B2 | 4/2010 | Willman et al. | |
| 7,856,424 B2 | 12/2010 | Cisler et al. | |
| 7,953,883 B2 | 5/2011 | Thomas et al. | |
| 7,966,397 B2 | 6/2011 | Dong et al. | |
| 8,032,942 B2 | 10/2011 | Smith et al. | |
| 8,271,618 B1 | 9/2012 | Kridlo | |
| 8,332,689 B2 | 12/2012 | Timashev et al. | |
| 8,346,726 B2 | 1/2013 | Liu et al. | |
| 8,432,791 B1* | 4/2013 | Masters ........... H04L 1/22 370/221 | |
| 8,438,347 B1 | 5/2013 | Tawri | |
| 8,635,429 B1 | 1/2014 | Naftel et al. | |
| 8,701,001 B2 | 4/2014 | Dovey et al. | |
| 8,719,286 B1 | 5/2014 | Xing et al. | |
| 8,726,075 B1 | 5/2014 | Lerner | |
| 8,745,444 B2 | 6/2014 | Timashev et al. | |
| 8,797,338 B2 | 8/2014 | Muir | |
| 8,849,759 B2 | 9/2014 | Bestler et al. | |
| 9,053,216 B1 | 6/2015 | Coleman et al. | |
| 9,323,638 B2 | 4/2016 | Coleman et al. | |
| 2003/0198182 A1 | 10/2003 | Pegrum et al. | |
| 2005/0138204 A1 | 6/2005 | Iyer et al. | |
| 2005/0175250 A1 | 8/2005 | Watanabe et al. | |
| 2006/0064744 A1 | 3/2006 | Jung et al. | |
| 2006/0271881 A1 | 11/2006 | Luciani, Jr. et al. | |
| 2007/0168058 A1 | 7/2007 | Kephart | |
| 2008/0281967 A1 | 11/2008 | Muhlestein et al. | |
| 2008/0307347 A1 | 12/2008 | Cisler | |
| 2009/0006640 A1 | 1/2009 | Brouwer et al. | |
| 2009/0031227 A1 | 1/2009 | Chakrabarti et al. | |
| 2009/0037655 A1 | 2/2009 | Cherian | |
| 2009/0037680 A1 | 2/2009 | Colbert et al. | |
| 2009/0075630 A1 | 3/2009 | McLean | |
| 2009/0276591 A1 | 11/2009 | Mu et al. | |
| 2009/0300614 A1* | 12/2009 | Shimogawa ........ G06F 9/4856 718/1 | |
| 2010/0011120 A1 | 1/2010 | Kommula | |
| 2010/0011178 A1 | 1/2010 | Feathergill | |
| 2010/0042942 A1* | 2/2010 | Vasilevsky ........ G06F 9/45533 715/764 | |
| 2010/0077160 A1 | 3/2010 | Liu | |
| 2010/0106691 A1 | 4/2010 | Preslan | |
| 2010/0114825 A1 | 5/2010 | Siddegowda | |
| 2010/0115334 A1 | 5/2010 | Malleck et al. | |
| 2010/0235396 A1 | 9/2010 | Chaurasia et al. | |
| 2010/0242083 A1 | 9/2010 | Begum et al. | |
| 2010/0306171 A1 | 12/2010 | Antos et al. | |
| 2011/0010560 A1 | 1/2011 | Etchegoyen | |
| 2011/0087874 A1 | 4/2011 | Timashev et al. | |
| 2011/0145199 A1 | 6/2011 | Prasad Palagummi | |
| 2011/0150433 A1 | 6/2011 | Alexandrov et al. | |
| 2011/0154350 A1 | 6/2011 | Doyle et al. | |
| 2011/0179417 A1 | 7/2011 | Inakoshi | |
| 2011/0202854 A1 | 8/2011 | Chan et al. | |
| 2011/0307657 A1 | 12/2011 | Timashev et al. | |
| 2012/0016839 A1 | 1/2012 | Yueh | |
| 2012/0054742 A1 | 3/2012 | Eremenko et al. | |
| 2012/0136909 A1 | 5/2012 | Wang et al. | |
| 2012/0144391 A1 | 6/2012 | Ueda | |
| 2012/0159475 A1 | 6/2012 | Abbondanzio et al. | |
| 2012/0191657 A1 | 7/2012 | Weinstein et al. | |
| 2012/0203733 A1 | 8/2012 | Zhang | |
| 2012/0304170 A1 | 11/2012 | Morgan | |
| 2013/0014086 A1 | 1/2013 | McFadden et al. | |
| 2013/0042083 A1 | 2/2013 | Mutalik et al. | |
| 2013/0054536 A1 | 2/2013 | Sengupta | |
| 2013/0091334 A1 | 4/2013 | Yu et al. | |
| 2013/0104140 A1 | 4/2013 | Meng et al. | |
| 2013/0117337 A1 | 5/2013 | Dunham | |
| 2013/0191341 A1 | 7/2013 | Alexander et al. | |
| 2013/0227177 A1 | 8/2013 | Cho | |
| 2013/0254196 A1 | 9/2013 | Babu et al. | |
| 2013/0262862 A1 | 10/2013 | Hartley et al. | |
| 2013/0290972 A1 | 10/2013 | Cherkasova et al. | |
| 2013/0298256 A1 | 11/2013 | Barnes et al. | |
| 2014/0006641 A1 | 1/2014 | James et al. | |
| 2014/0006760 A1 | 1/2014 | Nemiroff et al. | |
| 2014/0032735 A1 | 1/2014 | Kapoor | |
| 2014/0047011 A1 | 2/2014 | Lahav et al. | |
| 2014/0089727 A1 | 3/2014 | Cherkasova et al. | |
| 2014/0095600 A1 | 4/2014 | Needham | |
| 2014/0098671 A1 | 4/2014 | Raleigh et al. | |
| 2014/0149355 A1 | 5/2014 | Gupta | |
| 2014/0172802 A1 | 6/2014 | Kato et al. | |
| 2014/0176536 A1 | 6/2014 | Kern et al. | |
| 2014/0188805 A1 | 7/2014 | Vijayan | |
| 2014/0199176 A1 | 7/2014 | Tomeo et al. | |
| 2014/0201572 A1 | 7/2014 | Dancy et al. | |
| 2014/0229695 A1 | 8/2014 | Dinkar | |
| 2014/0247708 A1 | 9/2014 | Knox | |
| 2014/0279893 A1 | 9/2014 | Branton | |
| 2014/0281355 A1 | 9/2014 | Trieu | |
| 2014/0351214 A1 | 11/2014 | Abercrombie et al. | |
| 2015/0033224 A1 | 1/2015 | Maheshwari et al. | |
| 2015/0058916 A1 | 2/2015 | Rostami-Hesarsorkh et al. | |
| 2015/0113239 A1* | 4/2015 | Katori ............ G06F 3/0619 711/162 | |
| 2015/0161008 A1* | 6/2015 | Antony ............ G06F 11/1448 714/16 | |
| 2015/0227602 A1 | 8/2015 | Ramu | |
| 2015/0347548 A1 | 12/2015 | Mortensen et al. | |
| 2016/0350169 A1 | 12/2016 | McChord et al. | |

(56) References Cited

U.S. PATENT DOCUMENTS

OTHER PUBLICATIONS

Witten et al. "Data Mining: Practical Machine Learning Tools and Techniques", Jan. 20, 2011, Third Edition, Morgan Kaufmann, ISBN 0123748569.
Meagher, Paul, "Calculating Entropy for Data Mining", O'Reilly on Lamp.com; Jan. 6, 2005, www.onlamp.com/lpt/a/5522.
Information Theory, Wikipedia, http://wikipedia.org/wiki/Information_theory.
Halderman et al., "Lest We Remember: Cold Boot Attacks on Encryption Keys", Proc. 2008 USENIX Security Symposium, Feb. 21, 2008.
Shannon Entropy, Wiktionary, http://en.wiktionary.org/wiki/Shannon_entropy.
Lyda et al., "Using Entropy Analysis to Find Encrypted and Packed Malware", IEEE Security & Privacy; Mar./Apr. 2007, pp. 40-45, IEEE Computer Society.
Bouckaert et al., WEKA Manual for Version 3-7-11; University of Waikato www.cs.waikato.ac.nz/ml/weka/documentation.html.
U.S. Appl. No. 14/490,884, filed Sep. 19, 2014, Garvey et al.
Advanced NFTS Bot and MFT Repair, CGSecurity; retrieved on Mar. 28, 2014 from <http://www.cgsecurity.org/mw/index.php?title=Advancecd_NFTS_Boot_and_MFT_Repair&oldid=7651>, 2 pp.
Beary, G., Synchronizing ZFS Filesystems; Greg Beary's Blog, Oct. 6, 2007; retrieved on Jan. 8, 2014 from <https://blogs.oracle.com/GregB/entry/synchronizing_zfs_filesystems>, 5 pp.
Brown, P., ZREP Replication and Failover; retrieved on Aug. 1, 2014 from <http://www.bolthole.com/solaris/zrep/>, 3 pp.
Carrier, "File System Forensic Analysis," Addison Wesley, ISBN-13 978-0-321, pp. 26817-268174 (2005).
Collection and Differential Analysis of Volume Shadow Copy with ProDiscover, Technology Pathways, pp. 1-11; retrieved on Mar. 28, 2014 from <http://toorcon.techpathways.com/uploads/VolumeShadowCopyWithProDiscover-0912.pdf> (Sep. 2002).
FreeNAS® 9.2.1. Users Guide, 2011-2014 iXsystems, 280 pp.
Garfinkel, S. et al., "Advanced Forensic Format: An Open, Extensible Format for Disk Imaging," Advances in Digital Forensics II; IFIP Advances in Information and Communication Technology, vol. 222, Chapter 2, pp. 17-31, Springer, New York (2006).
International Search Report and Written Opinion mailed Sep. 8, 2016 from International Application No. PCT/US16/37696.
International Search Report and Written Opinion mailed Mar. 29, 2013 from corresponding International Application No. PCT/US13/22496.
Invitation to Pay Fees mailed Jun. 10, 2016 from International Application No. PCT/US16/25765.
McMillan, P.; ZFS Sync Over Unreliable, Slow Wan. ZFS Replication, or Rsync?; Oct. 10, 2010; retrieved on Aug. 1, 2014 from <http://serverfault.com/questions/189420/zfs-sync-over-unreliable-slow-wan-zfs-replication-or-rsync>, 3 pp.
Notice of Allowance mailed Feb. 24, 2015 from U.S. Appl. No. 14/456,981.
Notice of Allowance mailed Nov. 1, 2016 from U.S. Appl. No. 14/292,737.
Notice of Allowance mailed Dec. 23, 2015 from U.S. Appl. No. 14/702,397.
Office Action mailed Jul. 13, 2015 from U.S. Appl. No. 13/746,763.
Office Action mailed Aug. 13, 2015 from U.S. Appl. No. 14/702,397.
Office Action mailed Aug. 15, 2014 from U.S. Appl. No. 13/746,763.
Office Action mailed Dec. 22, 2014 from U.S. Appl. No. 13/746,763.
Oracle® ZFS Storage Applicance Security Guide, Sep. 1, 2013, 25 pp.
Php-file-sync; GitHub; retrieved on Jan. 8, 2014 from <https://github.clom/sergio-bobillier/php-file-sync>, 3 pp.
Round, M. ZFS Replication; Marks' Blog; Jul. 11, 2007; retrieved on Jan. 8, 2014 from <http://www.markround.com/archives/38-ZFS-Replication.html>, 8 pp.
Witten et al., "Data Mining: Practical Machine Learning Tools and Techniques," Third Edition, Morgan Kaufmann, ISBN 0123748569 (Jan. 20, 2011).
Zfsync/Commits; GitHub; retrieved on Aug. 1, 2014 from <https://github.com/jrssystemsnet/sfsync/commits/master>, 2 pp.

* cited by examiner

Figure 2  Example Data Flow: Screenshot Verification Profile Generation for Multiple Operating System Configurations Using Register State Monitoring Example Data Flow: Boot State Verification Using Screenshot and Register Value Profiles Example Logic Flow: OS Incremental Version Generation and Snapshot Creation, OSVG Component Example Logic Flow: Generating OS Register Profiles and Screenshot Conditional Statements, RPS Component

Example Logic Flow: Determine OS Loading Screen State Using CPU Register Values, OBC Component

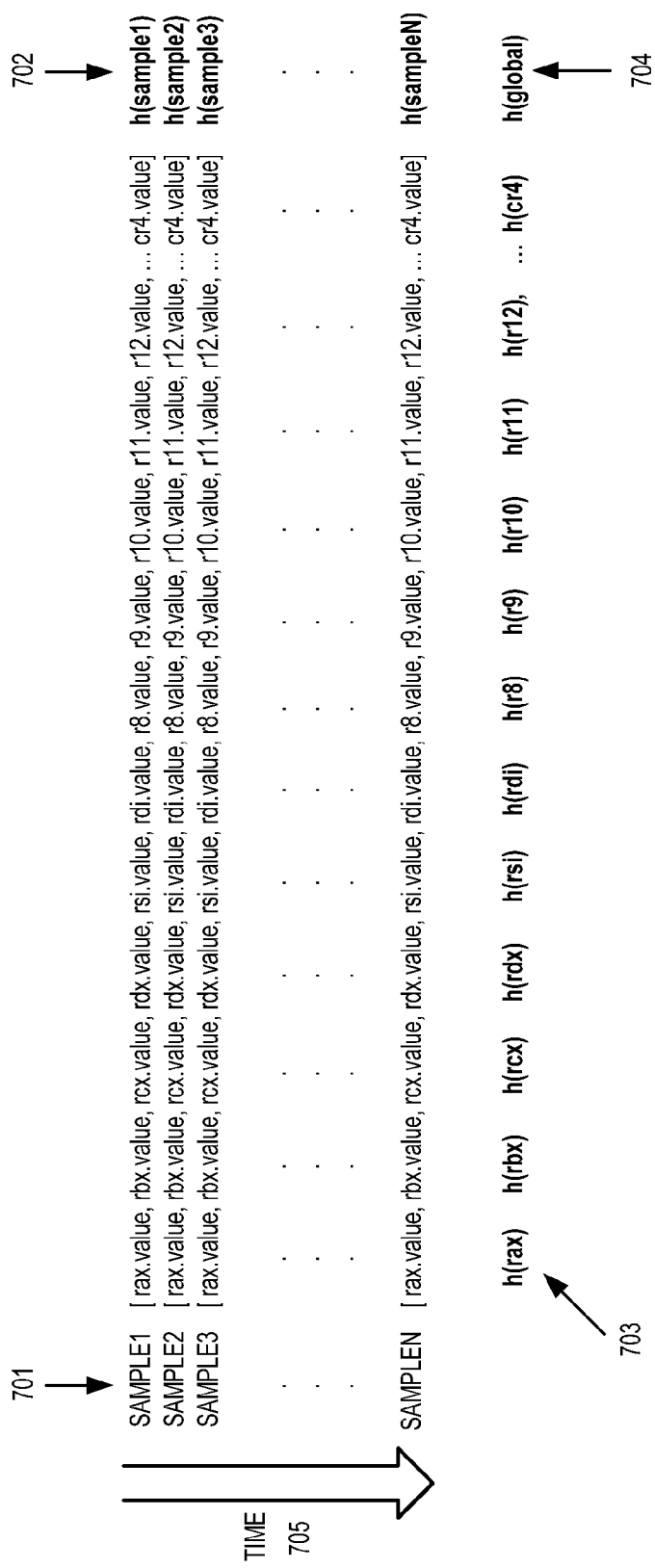
Figure 7 Examples of entropies calculated from a set of N samples comprising register values of a CPU over time.

Example Logic Flow: Generating OS Register Profiles and Screenshot Conditional Statements, RPS Component

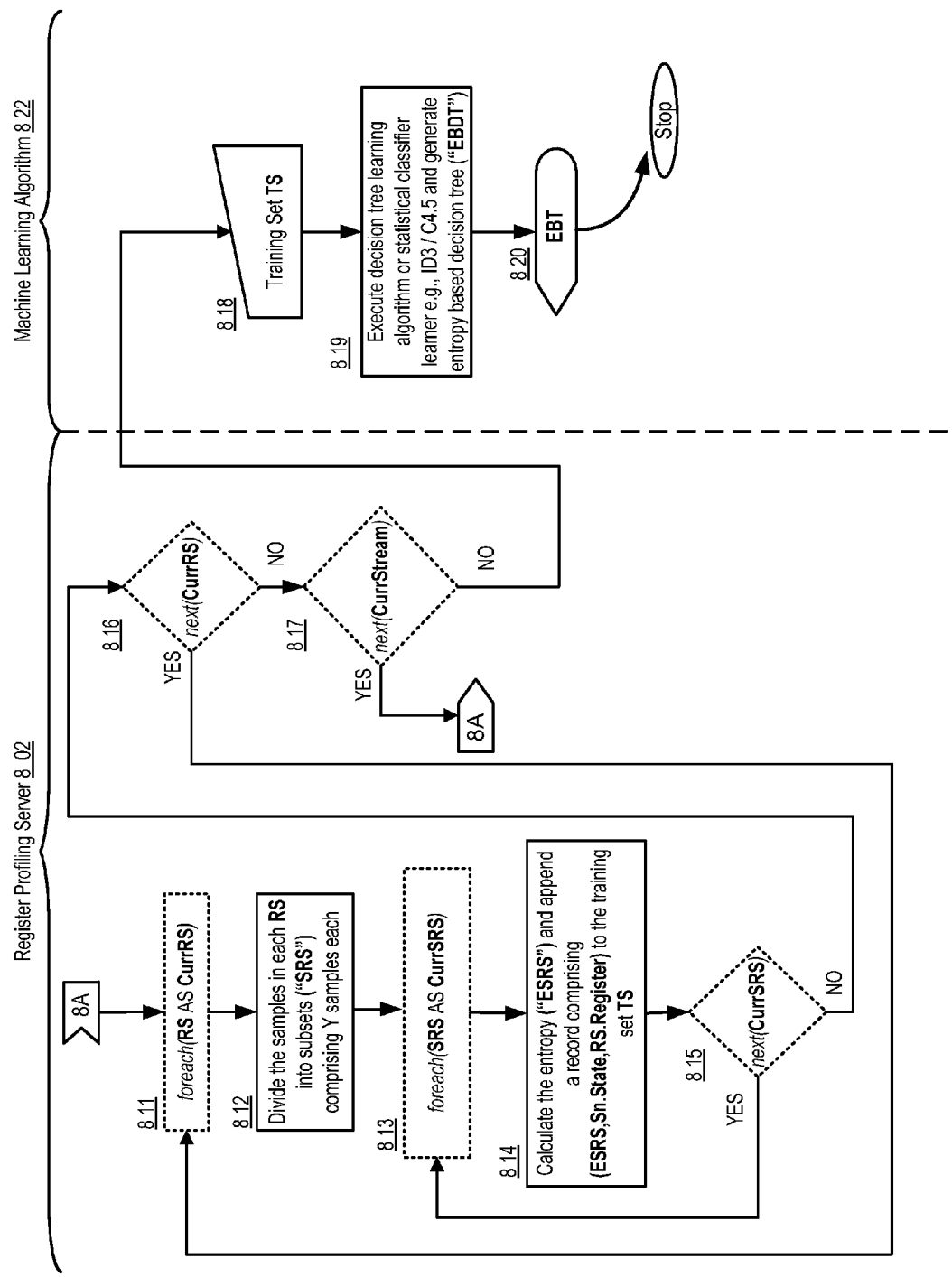
Figure 8B  Example Logic Flow: Generating OS Register Profiles and Screenshot Conditional Statements, RPS Component under US 9,836,347 B2

APPARATUSES, METHODS AND SYSTEMS FOR DETERMINING A VIRTUAL MACHINE STATE

CROSS-REFERENCE TO RELATED PATENT APPLICATIONS

This application is a continuation of U.S. Non-Provisional patent application Serial No. 14/702,397, filed May 1, 2015, entitled "APPARATUSES, METHODS AND SYSTEMS FOR DETERMINING A VIRTUAL MACHINE STATE BASED ON CPU REGISTERS", which is a continuation of U.S. Non-Provisional patent application Ser. No. 14/456,981, filed Aug. 11, 2014, (now U.S. Pat. No. 9,053,216), entitled "CPU REGISTER ASSISTED VIRTUAL MACHINE SCREENSHOT CAPTURE TIMING APPARATUSES, METHODS AND SYSTEMS", which claims priority to U.S. Provisional Patent Application No. 61/864,358, filed Aug. 9, 2013, and entitled "CPU REGISTER ASSISTED MACHINE STATE VERIFICATION APPARATUSES, METHODS AND SYSTEMS", the disclosure of which is incorporated herein by referenced in its entirety.

The entire contents of the aforementioned application(s) are expressly incorporated by reference herein.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address the use of virtual machine and hardware based CPU registers to assist in the identification of operating system load states, and more particularly, include APPARATUSES, METHODS AND SYSTEMS FOR DETERMINING A VIRTUAL MACHINE STATE.

BACKGROUND

Modern computers utilize registers to perform low-level operations and are directed by instructions from an architecture instruction set. Computer systems, including servers, may be backed up to local or remote storage. Periodically, backup integrity may be evaluated to ensure backups were completed successfully.

BRIEF DESCRIPTION OF THE DRAWINGS

FIG. 7 shows some examples of entropies calculated from a set of N samples comprising register values of a CPU over time, in one implementation of the CRV operation;

FIGS. 8A-B show an additional example of a logic flow illustrating generating OS register profiles and screenshots conditional statements, e.g., an example alternative RPS Component, in one implementation of the CRV operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2A, 2B, etc.

DETAILED DESCRIPTION

In some embodiments, an APPARATUSES, METHODS AND SYSTEMS FOR DETERMINING A VIRTUAL MACHINE STATE (hereinafter "CRV") transforms register retrieval requests, via CRV components, into boot success messages and screenshot capture command invocation outputs.

Figure 1:
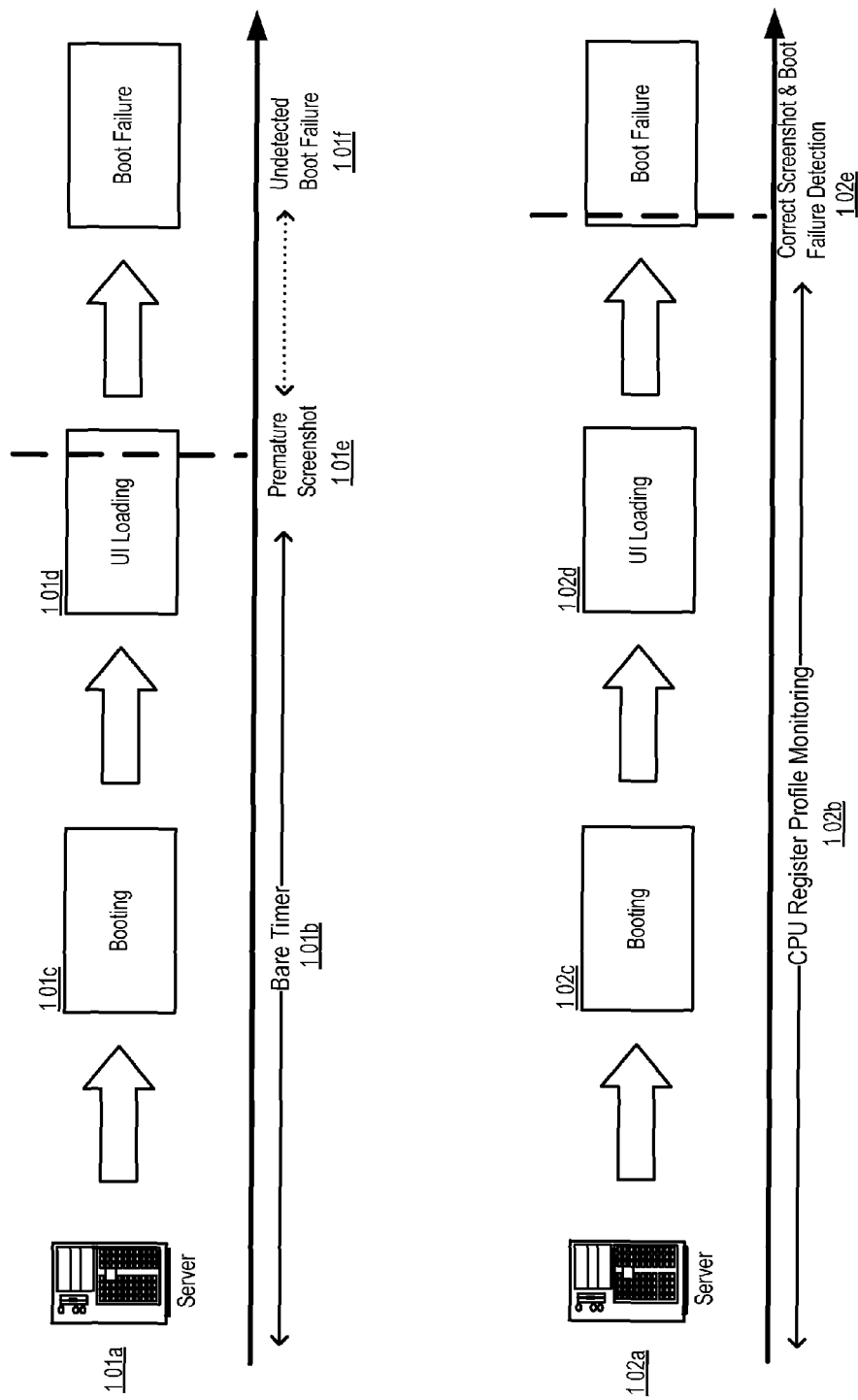
FIG. 1 shows an example block diagram illustrating aspects of the CRV, in one implementation of the CRV operation.

FIG. 1 shows an example block diagram illustrating aspects of the CRV, in one implementation of the CRV operation. A server 101a can be booted by a server administrator, an automated process, and/or the like. An application or component wishing to capture a screenshot upon completion of the server's boot sequence can utilize a bare timer 101b that simply waits a predetermined number of seconds before blindly capturing a screenshot. The server can pass through multiple states and output multiple discrete display configurations before arriving at a stable state of either a successful boot or a boot failure. For example, the server can initially be in an early booting configuration low, which can proceed to a UI loading display output 101d. The server's bare timer 101b, can then incorrectly capture a screenshot prematurely 101e, e.g., at the UI loading display output screen lord. As such, a boot failure screen can go undetected 101f.

In one embodiment, a server 102a can also be booted. CPU register profile monitoring can be used to observe the server register values, and/or their associated entropies, as the server passes through various boot states and display output configurations. For example, the server can initially be in an early boot display output configuration 102c, followed by a UI loading display output configuration 102d which is ultimately followed by a boot failure. In an example CPU register profile monitoring embodiment, the arrival of server 102a at a boot failure state can be readily detected and a screenshot of the failure output can be captured for further processing 102e.

In alternative embodiments, the CPU register state of an operating system that is not virtualized but is running on bare-metal hardware can be discerned by a custom BIOS. In still other embodiments, a hardware-based device can be used to inspect the current register values of a booting server, such as for example a PCI express card in communication with the booting server and configured to read the current register values. In other embodiments, the register profiling and conditional statements capability described herein can be used to detect events other than or in addition to an operating system load state. For example, the register states can similarly be used to determine if an application is currently running on a server, e.g., Microsoft Exchange and/or the like. Furthermore, the detection of register states and the association of register states with events can be chained together such that, for example, an operating system loading state can be first determined and then an application load state can be subsequently determined. In still other embodiments, custom conditional statements can be similarly created to detect a compromised operating system, such as for example by purposely infecting a sandboxed virtual machine and executing a register profile procedure on said infected virtual machine in order to determine a conditional statement that can be utilized to detect a similarly compromised operating system. In still other embodiments, the techniques described herein can be used to determine an operating system version, a system type, what software (including custom software) can be installed on a server, what software is installed on a server, the usage characteristics associated with a user of a server and/or software on a server, and/or the like. Furthermore, embodiments of the inventions can be used on any processing device, configured with any software operating system or operating independently, that supports or is capable of reading register states or their equivalents, reading register values or their equivalents, or determining register entropy values, from a central processing unit or other similar processing unit, e.g., a graphical processing unit and/or the like.

Figure 2:
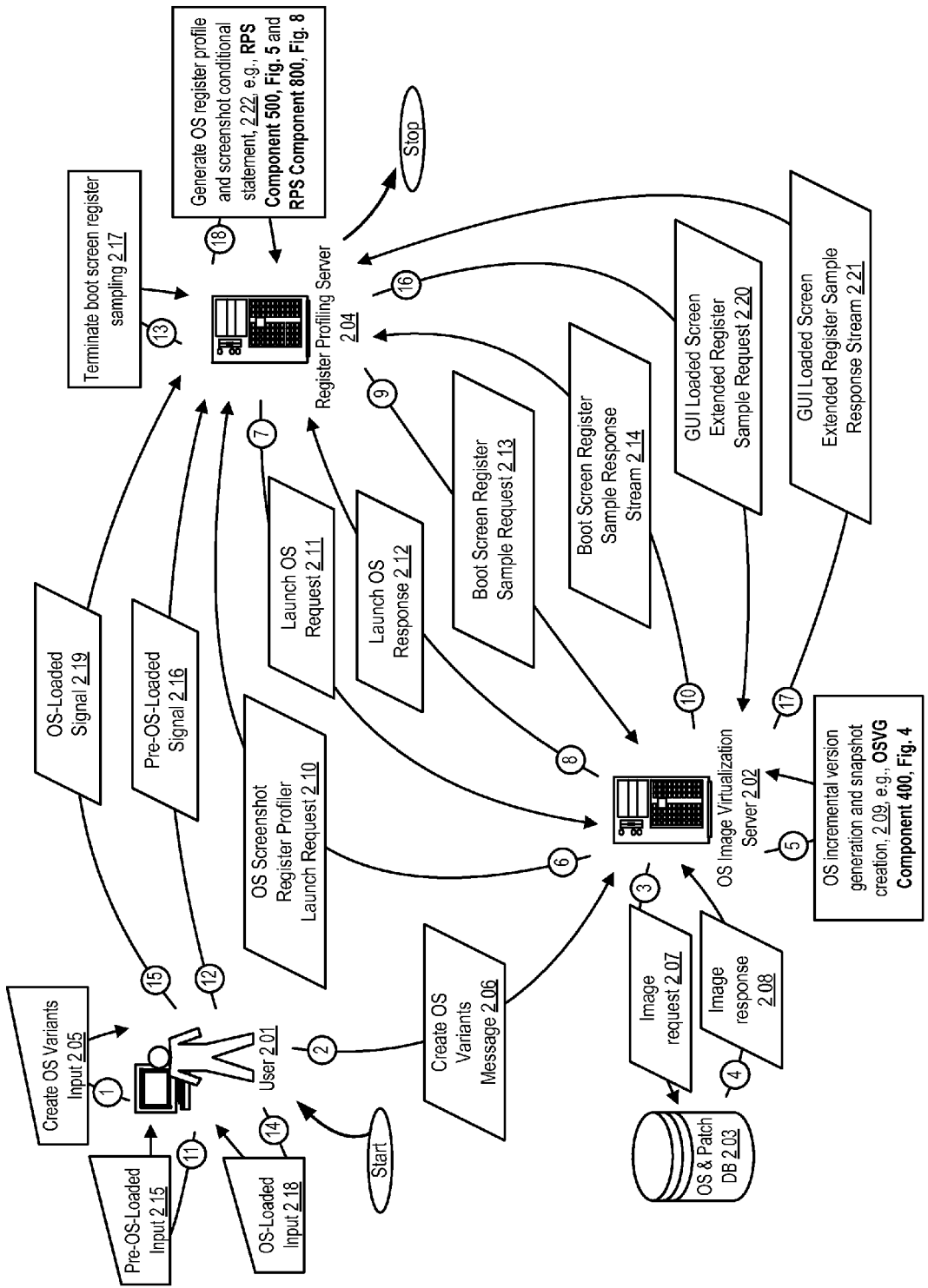
FIG. 2 shows an example data flow illustrating aspects of screenshot verification profile generation for multiple operating system configurations using register state monitoring, in one implementation of the CRV operation.

FIG. 2 shows an example data flow illustrating aspects of screenshot verification profile generation for multiple operating system configurations using register state monitoring, in one implementation of the CRV operation. In one embodiment, user 201 can utilize a client device to create an operating system variants input. An operating system variants input can be a command to instruct an operating system image virtualization server, 202, to create incremental version snapshots of an operating system. In one embodiment, a create operating system variants message 206 can be transmitted from the user client device to operating system image virtualization server 202. The operating system image virtualization server can then create a query to retrieve a base operating system image, e.g. an image request 207. A base operating system image can be, for example, an ISO file representing an operating system install media a virtual hard drive file or in general a raw file and/or the like files. We can define a raw file as a file containing a block-for-block copy that can be either a block-by-block representation of a device from which the raw file was derived or a sparse file wherein the raw file can exclude redundant block segments including empty blocks comprised in the device from which the raw file was derived. In some embodiments a raw file can be converted into a Virtual Hard Disk (VHD), a Virtual Machine Disk (VMDK) and/or the like disk files by appending or pre-appending metadata about a source bootable block storage device to the raw data file. In some embodiments the virtual hard drive file is already in the form of a VHD, VMDK and/or the like image files. In another embodiment, a base operating system image can be a path to a network directory containing an operating system executable suitable for installing said operating system. An example listing, substantially in the form of PHP/SQL commands, for querying a OS and Patch database 203 for a base operating system image is provided below:

```
<?php
header('Content-Type: text/plain');
mysql_connect("localhost", $DBuser, $DBpassword);
mysql_select_db("os_images");
$query = "SELECT * from os
    LEFT JOIN os_patches ON os.os_id = os_patches.os_id
    WHERE os.name = '$osName';
$result = mysql_query($query);
mysql_close("os_images"); // close database access
?>
```

In one embodiment, an operating system and patch database 203 can respond with an image response message 208. An example image response message 208, substantially in the form of an HTTP(S) POST message including XML-formatted data, is provided below:

```
POST /os_image_response.php HTTP/1.1
Host: www.osimagevirtualizationserver.com
Content-Type: Application/XML
Content-Length: 667
<?XML version = "1.0" encoding = "UTF-8"?>
<image_response>
    <timestamp>2020-12-12 15:22:43</timestamp>
    <credentials>
       <password>secretpass1234</password>
       <crypto_key>h767kwjiwnfe456#@hnniimidrtsxbi</crypto_key>
    </credentials>
    <image type="base">
       <image_location type="local_file"
          version="9.0"
          number_variants="8"
          path="/var/images/windows_server_base.iso">
    </image>
</image_response>
```

In one embodiment, the operating system image virtualization server 202 can then generate incremental operating system versions. Further detail with regard to operating system incremental version generation and snapshot creation 209 can be found with respect to FIG. 4, e.g. an example OSVG Component 400. In one embodiment, OS image virtualization server 202 can generate an operating system screenshot register profiler request 210. The profiler request can specify a base operating system, an operating system incremental version such as a service pack level, and/or the like. In one embodiment, the register profiling server 204 can then initiate a procedure to collect register value data from a plurality of operating systems at various stages of boot launch. For example, in one embodiment, register profiling server 204 can transmit a launch operating system request 211 to operating system image virtualization server 202. A launch operating system request 211 can specify a base operating system and/or a particular snapshot that is to be profiled. An example launch operating system request 211, substantially in the form of an HTTP(S) POST message including XML-formatted data, is provided below:

```
POST /os_launch_request.php HTTP/1.1
Host: www.osimagevirtualizationserver.com
Content-Type: Application/XML
Content-Length: 667
<?XML version = "1.0" encoding = "UTF-8"?>
<os_launch_request>
    <timestamp>2020-12-12 15:22:53</timestamp>
```

```
<credentials>
    <password>secretpass1234</password>
    <crypto_key>h767kwjiwnfe456#@hnniimidrtsxbi</crypto_key>
</credentials>
<to_launch type="incremental">
    <base_os version="9.0">
    <add value="service_pack_1" />
    <add value="service_pack_2" />
</to_launch>
</os_launch_request>
```

In one embodiment, operating system image virtualization server 202 can then respond with a launch operating system response 212. Upon being notified that the operating system image virtualization server has launched the target operating system for profiling, the register profiling server can then initiate a boot screen register sample request 213. A boot screen register sample request can be a request that rapidly samples a hardware-based or virtual machine based central processing unit's register values during a booting state. Executable code substantially in the form of a bash shell script suitable for rapidly sampling CPU register values is:

```
sample_boot ( ) {
    phase=1
    # Sample boot data.
    echo "Collecting boot-phase CPU register data."
    i=1
    while true; do
        sleep .5
        VBoxManage debugvm $vm info cpumguest | grep -v ^Guest |
        sed
's/r8 /r8/g;s/r9 /r9/g' | tr ' ' '\n' | grep -v ^$ | grep = >
$vm-boot-$(printf "%0*d" 4 $i).log
        ((i++))
    done
}
```

In response the operating system image virtualization server 202 can respond with a boot screen register sample response stream 214, which can contain an array of register values as well as, in some embodiments, a timestamp representing when a given set of register values was collected. In some embodiments, the boot screen register sample response stream can be representative of only one set of register values, while in other embodiments, the stream can contain a plurality of register value states. An example CPU register response containing a current CPU register value sample is:

```
        Array
        (
            [rax] => 000000000002bb21
            [rbx] => 0000000000000000
            [rcx] => ffffa80038c2290
            [rdx] => ffffa8003856078
            [rsi] => ffff80001806e80
            [rdi] => 0000000000000001
            [r8]  => 0000000000000000
            [r9]  => 00000000029dcbf2
            [r10] => 00000000000146bd
            [r11] => ffff8000143acc0
            [r12] => ffffa8003856050
            [r13] => ffffa8003854300
            [r14] => ffffa8003856000
            [r15] => 0000000000000000
            [rip] => ffff880030f27f2
            [rsp] => ffff8000143ac98
            [rbp] => 0000000000000000
            [iopl] => 0
            [cs] => 0010
            [ss] => 0018
            [ds] => 002b
            [es] => 002b
            [fs] => 0053
            [gs] => 002b
            [tr] => 0040
            [eflags] => 00000246
            [cr0] => 80050031
            [cr2] => 7fefa4d1a80
            [cr3] => 00187000
            [cr4] => 000006f8
            [gdtr] => ffff80001433000:007f
            [ldtr] => 0000
        )
```

Upon observing that the operating system currently being booted will reach a launched or failure state imminently, the user device can initiate a pre-operating system loaded input 215, which can then transmit an operating system preload signal 216. Upon receiving an operating system preload signal 216, register profiling server 204 can terminate the boot screen register sampling, e.g. 217. After a given time quantum, the operating system being booted on operating system image virtualization server 202 can thereafter reach a successfully booted state. In response to observing the operating system image virtualization server reaching a successfully booted state, the user client device can generate an operating system loaded input 218, and transmit an operating system loaded signal 219 to register profiling server 204. The register profiling server 204 can thereafter begin again sampling register values to determine applicable register values of the target operating system while in the successfully booted state, e.g. a GUI loaded screen extended register sample request 220. In some embodiments, the operating system image virtualization server 202 can then reply to the register profiling server with a GUI loaded screen extended register sample response stream 221. In some embodiments, the contents of the GUI loaded screen extended register sample response stream can be substantially similar to that found with respect to a boot screen register sample response stream 214. In one embodiment, after a period of time such as one hour, the register sampling can be terminated by the register profiling server and the register profiling server can thereafter generate an operating system register profile and screenshot conditional statement for use in determining the boot state of an operating system being booted. Further detail with respect to generating an operating system register profiling screenshot conditional statement can be found with respect to FIGS. 5 and 8A-B, e.g., example RPS Components.

Figure 3:
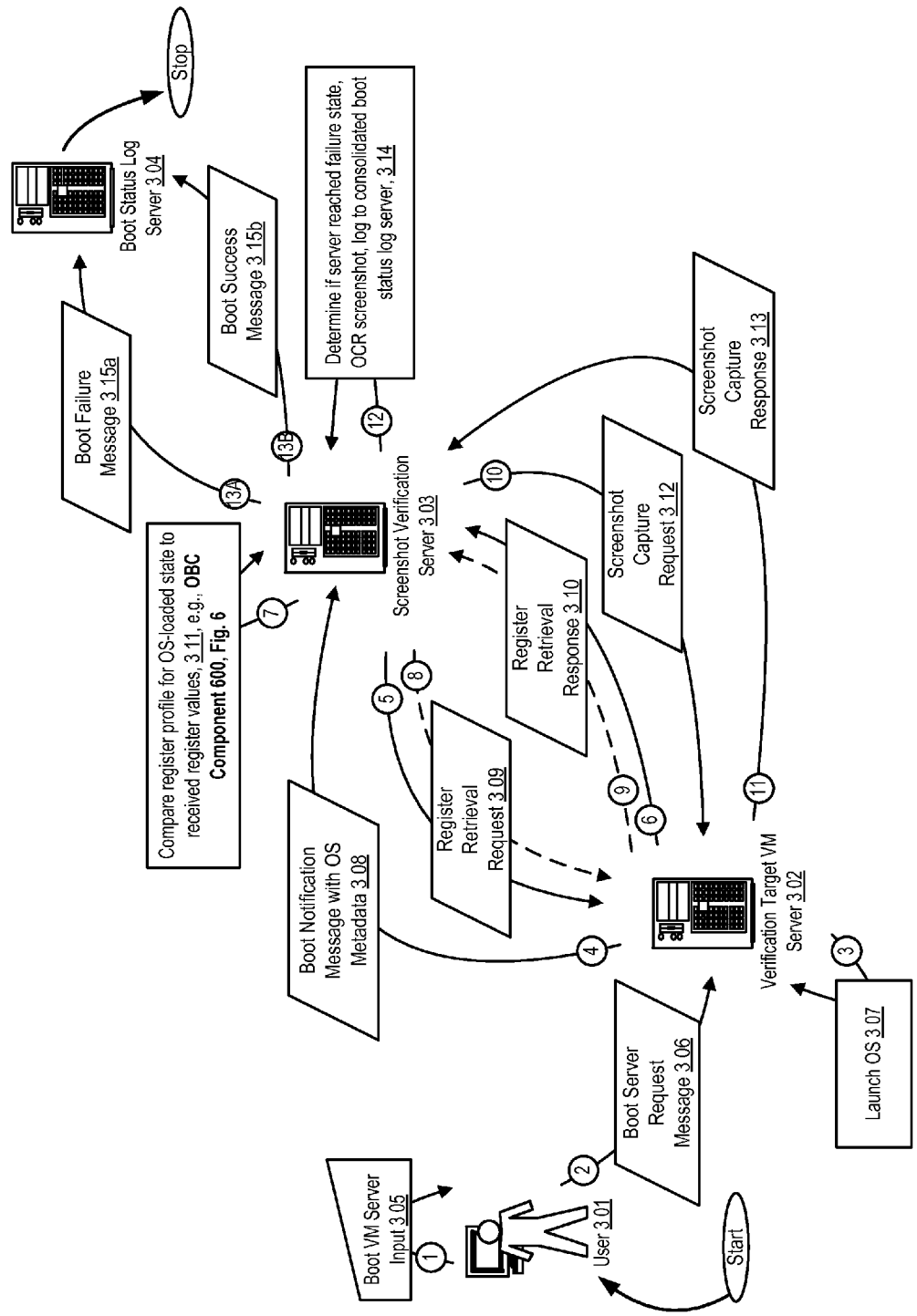
FIG. 3 shows an example data flow illustrating aspects of boot state verification using screenshot and register value profiles, in one implementation of the CRV operation.

FIG. 3 shows an example data flow illustrating aspects of boot state verification using screenshot and register value profiles, in one implementation of the CRV operation. In one embodiment, user 301 in communication with a client terminal can initiate a virtual machine server boot input 305. The server boot input can specify a virtual machine image that is to be booted on verification target virtual machine server 302. In one embodiment, a boot server request message 306 is transmitted from the user client device to the verification target virtual machine server 302. In response to receiving a boot server request message 306, the verification target virtual machine server 302 can proceed to launch the target operating system, e.g. 307. In one embodiment, launching the operating system can involve retrieving an operating system image, creating a virtual machine hard drive from an operating system image, associating a virtual machine hard drive with a hypervisor, and/or the like. The type of hypervisors that can be employed include but are not limited to kernel based hypervisors, application based hypervisors and /or the like. Some examples of specific commercially and open source available hypervisors include but are not limited to Oracle VM VirtualBox; VMware ESXi and ESX; Kernel-based Virtual Machine hypervisors; Microsoft Virtual PC; and Microsoft Hyper-V and the like commercially and open source available hypervisors. In one embodiment, the verification target virtual machine server can notify a screenshot verification server 303 that an operating system to be monitored is currently being booted, e.g. a boot notification message with operating system metadata 308. In other embodiments, the register profiling server can periodically poll the operating system image virtualization server and so can be informed of an operating system loading state without a launch OS request 211. In still other embodiments, the register profiling server can be the same as the operating system virtualization server. In some embodiments, the boot notification message can contain supplemental data regarding the operating system that is currently being booted so as to enable the screenshot verification server to properly monitor and associate the CPU register values with the correct operating system. In other embodiments, the source of the message, properties such as the length of the message, a MAC address of the requesting device, and/or the like can be used to determine the operating system being launched. In one embodiment, in order to monitor the current register state, screenshot verification server 303 can initiate a register retrieval request 309 to verification target virtual machine server 302. In response, the verification target virtual machine server can retrieve the current register values associated with the CPU of the launching virtual machine. Executable code substantially in the form of a partial bash shell script suitable for retrieving the current register values of a booting operating system is:

```
VBoxManage debugvm $vm info cpumguest | grep -v ^Guest | sed
's/r8 /r8/g;s/r9 /r9/g' | tr ' ' '\n' | grep -v $ | grep = >
$vm-gui-$(printf "%0*d" 4 $i).log
```

In one embodiment, the verification target virtual machine server 302 can respond to the register retrieval request with a register retrieval response 310. A register retrieval response can contain the current register state, e.g. the values currently loaded into the CPU registers. An example register retrieval response 310 showing the CPU registers in a successfully booted state is:

```
POST /register_retrieval_response.php HTTP/1.1
Host: www.screenshotverificationserver.com
Content-Type: Application/XML
Content-Length: 667
<?XML version = "1.0" encoding = "UTF-8"?>
<register_retrieval_response>
    <timestamp>2020-12-12 15:23:05</timestamp>
    <credentials>
        <password>secretpass5678</password>
        <crypto_key>rtexdresresewkjytr657</crypto_key>
    </credentials>
    <registers os_id="9"
            os_patch_level="9.4321"
            datatype="associative_array">
        [rax] => 000000000002bb21
        [rbx] => 0000000000000000
```

-continued

```
        [rcx] => ffffa80038c2290
        [rdx] => ffffa8003856078
        [rsi] => ffff80001806e80
        [rdi] => 0000000000000001
        [r8] => 0000000000000000
        [r9] => 00000000029dcbf2
        [r10] => 00000000000146bd
        [r11] => ffff8000143acc0
        [r12] => ffffa8003856050
        [r13] => ffffa8003854300
        [r14] => ffffa8003856000
        [r15] => 0000000000000000
        [rip] => ffff880030f27f2
        [rsp] => ffff8000143ac98
        [rbp] => 0000000000000000
        [iopl] => 0
        [cs] => 0010
        [ss] => 0018
        [ds] => 002b
        [es] => 002b
        [fs] => 0053
        [gs] => 002b
        [tr] => 0040
        [eflags] => 00000246
        [cr0] => 80050031
        [cr2] => 7fefa4d1a80
        [cr3] => 00187000
        [cr4] => 000006f8
        [gdtr] => ffff80001433000:007f
        [ldtr] => 0000
    </registers>
<register_retrieval_response>
```

In one embodiment, the screenshot verification server 303 can retrieve an operating system register profile and/or a register value conditional statement and compare the received register values to the register conditional statement. Further detail with respect to comparing register profiles for an operating system loaded state to received register values, e.g. 311, can be found with respect to FIG. 6, e.g., an example OBC Component. In some embodiments, the screenshot verification server and the verification target server can engage in multiple rounds of register retrieval request/register retrieval response communications. In one embodiment, upon determining that the verification target virtual machine server has reached a specified boot state, which can include but is not limited to a successfully booted state and/or a failure boot state, the screenshot verification server can initiate a screenshot capture request 312. The screenshot capture request can be a request to retrieve as an image the current display output from the booting operating system. In response, the verification target virtual machine server 302 can transmit a screenshot capture response 313 to the screenshot verification server 303. The screenshot capture response can contain an image, such as a JPEG image or a TIFF image representing the current visual output (e.g., output that would be shown on a monitor connected to the booting machine) from the booting server. Such output can be obtained by, for example, executing a command integrated into the booting operating system. In one embodiment, the screenshot verification server can thereafter determine if the server reached a successfully booted state or is in a failed boot state, can utilize optical character recognition in order to extract text from the received screenshot capture, can log to a consolidated boot status log server the status of the current boot operation, and/or the like, e.g. 314. In some embodiments, the screenshot verification server 303 can transmit a boot failure message 315*a* and/or a boot success message 315*b* to a boot status log server 304. A boot status log server can, in some embodiments, aggregate boot failure and success messages for multiple verification target virtual machine servers over time such that an administrator can easily monitor and view screenshots of target operating systems in success and/or failure boot states.

Figure 4:
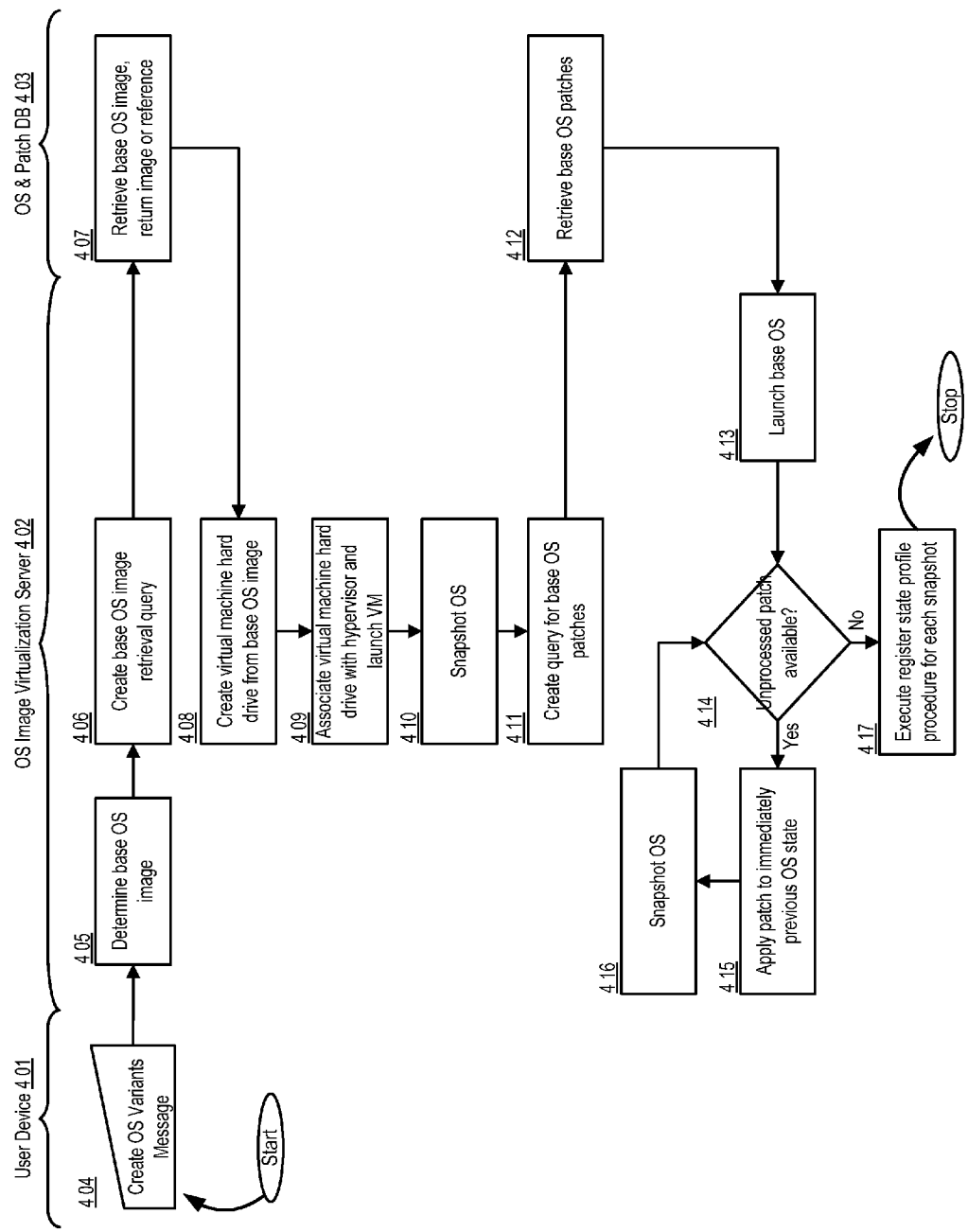
FIG. 4 shows an example logic flow illustrating aspects of operating system incremental version generation and snapshot creation, e.g., an example OSVG Component, in one embodiment.

FIG. 4 shows an example logic flow illustrating aspects of operating system incremental version generation and snapshot creation, e.g., an example OSVG Component, in one implementation of the CRV operation. In one embodiment, an administrator can wish to generate operating system variants such as, for example, virtual machine images containing snapshots of an operating system in an as released configuration as well as a configuration after each update such as a service pack application and/or the like. Upon the successful generation of incremental operating system versions, the register states and register values of the operating system and all of its variants can be captured in an automated fashion such as to enable the association of discrete register states with various display outputs and server status states. In one embodiment, user device 401 can create an operating system variants message 404, and transmit the message to an operating system image virtualization server 402. In one embodiment, the virtualization server 402 can determine a base operating system image 405 and create a query to retrieve the base operating system image for further processing 406. For example, operating system and patch database 403 can retrieve the base operating system image and return the image or a reference value providing access to the image 407. In one embodiment, the operating system image virtualization server 402 can create a virtual machine hard drive from the base operating system image. In other embodiments, the virtualization server can instead install the base operating system on dedicated hardware, e.g., in a non-virtualized manner. In so doing, the component can be used to generate incremental operating system versions for both virtual and hardware based operating system configurations. In one embodiment, the virtualization server can associate a created virtual machine hard drive with a hypervisor and launch a virtual machine 409. Upon successful booting of the virtual machine a snapshot of the operating system can be taken 410. In one embodiment, the virtualization server can create a query for a base operating system patch list and/or operating system patches. Operating system and patch database 403 can retrieve patches applicable to the base operating system 412, such as by querying a database using the major version number for the base operating system currently being examined. In one embodiment, the base operating system can be launched 413 and if there are unprocessed operating system patches, 414, the patches can be individually applied or applied in a group manner to the currently running operating system 415. In one embodiment, a snapshot of the patch operating system can be taken 416. The procedure can continue until there are no unprocessed patches available. In so doing, the virtual machine as configured can be reverted to one of a plurality of snapshots representing the operating system at a given patch level and/or on a particular release date. Upon completion of the operating system incremental version generation, the register state profile procedure for each snapshot, each major version of the operating system and/or the like, can be executed 417.

Figure 5:
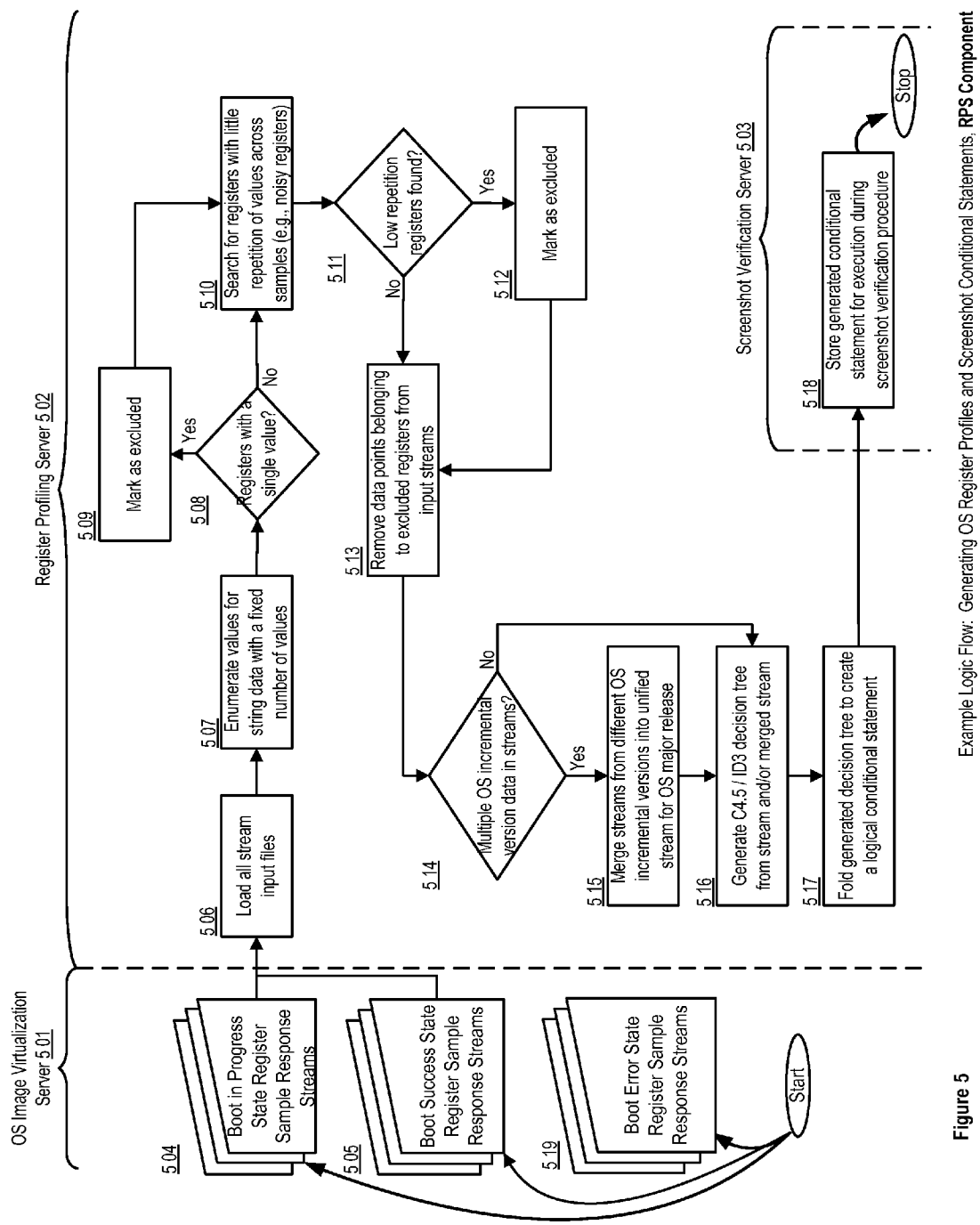
FIG. 5 shows an example logic flow illustrating aspects of generating operating system register profiles and screenshot conditional statements, e.g., an example RPS Component, in one implementation of the CRV operation.

FIG. 5 shows an example logic flow illustrating aspects of generating operating system register profiles and screenshot conditional statements, e.g., an example RPS Component, in one implementation of the CRV operation. In one embodiment, operating system image virtualization server 501 can receive inputs such as boot in progress state register sample response streams, e.g. 504, boot success state register sample response streams, e.g. 505, boot error state register sample response streams, e.g., 519, and/or the like. The inputs can be transmitted to register profiling server 502, which can load the stream input files 506. In one embodiment, the register profiling server can enumerate values for string data with a predetermined number of values, such as can be the case for data regarding operating system names. For example, if it can be determined that there are only three operating system sub-variants within a major release that are relevant to the current register profile analysis, then those enumerated values can be replaced for string values in the stream input files. In one embodiment, if the register only contains a single value 508, the register can be marked as excluded from analysis 509. In one embodiment, registers that frequently stay at a single value during or between a server booting state, a server success booted state, and/or a server failure booted state, may not be useful in determining the current state of a server and as such can be excluded. In one embodiment, registers that frequently change values in a noisy manner, such as registers that have few repetitions of value across samples within the input streams, 510, may additionally not be useful in determining a server boot state. In one embodiment, if such low repetition registers are found 510, they can be marked as excluded 512. In further embodiments, data points belonging to excluded registers can be suppressed or removed from the stream inputs 513. If multiple operating system incremental version data is contained within the streams 514, the streams from different operating system incremental versions can be unified such that all incremental versions for a single major operating system release are considered together 515. In one embodiment, a decision tree, such as a C4.5/ID3 decision tree, can be generated from the stream and/or from the merged stream. An open source tool with an application programming interface suitable for the generation of decision trees is Weka. In the example below, the decision tree (also known as a classifier) indicates true if the server is in a boot success state (e.g., the OS has successfully loaded) and false if the server is in a boot in-progress state (e.g., the OS load is ongoing). An example decision tree suitable for use by an exemplary RPS Component is:

```
rdi = 0000000000000001
|   r9 = 0000000000000001: FALSE (5.0)
|   r9 != 0000000000000001
|   |   ss = 0000: FALSE (3.0)
|   |   ss != 0000
|   |   |   cr2 = ffff900c1c1b000: TRUE (11.0)
|   |   |   cr2 != ffff900c1c1b000
|   |   |   |   rax = 000000000001f793: FALSE (5.0)
|   |   |   |   rax != 000000000001f793: TRUE (136.0/18.0)
rdi != 0000000000000001
|   cr3 = 00187000: FALSE (212.0/1.0)
|   cr3 != 00187000
|   |   cr3 = 799a3000: FALSE (2.0)
|   |   cr3 != 799a3000: TRUE (16.0/2.0)
```

In one embodiment, the generated decision tree can be folded and/or collapsed in order to create a logical conditional statement. A logical conditional statement can be a representation of the decision tree as a series of if/then statements, as a plurality of switch statements, and/or executable instructions in any form suitable for evaluating inputs in relation to the decision tree. In other embodiments, the decision tree can not be folded and can be stored in a format such as, for example, a directed graph. An example logical conditional statement suitable for use in an RPS component is:

```
if( array_key_exists('eax',$registers) ) {
    return false;
}
if( $registers['rdi'] == '0000000000000001' ) {
    if( $registers['r9'] != '0000000000000001'
        && $registers['ss'] != '0000' ) {
        if( $registers['cr2'] == 'ffff900c1c1b000' ) {
            return true;
        }
    }
    else {
        if( $registers['rax'] != '000000000001f793' ) {
            return true;
        }
    }
}
else {
    if( $registers['cr3'] != '00187000'
        && $registers['cr3'] != '799a3000' ) {
        return true;
    }
}
```

In one embodiment, the generated logical conditional statement can be transmitted to a screenshot verification server 503, e.g., 518. The screenshot verification server can store the generated conditional statement and use the conditional statement during a screenshot verification procedure to determine if and/or when a server has arrived at a given state. In one embodiment, logical conditional statements can be created that represent multiple states of a server. For example, a logical conditional statement can be created to represent a server in a successfully booted state such as when a graphical user interface and or a login prompt is displayed. In other embodiments, a logical conditional statement can be generated to represent a server boot failure state, such as can be present when the server encounters an unrecoverable error during booting.

Figure 6:
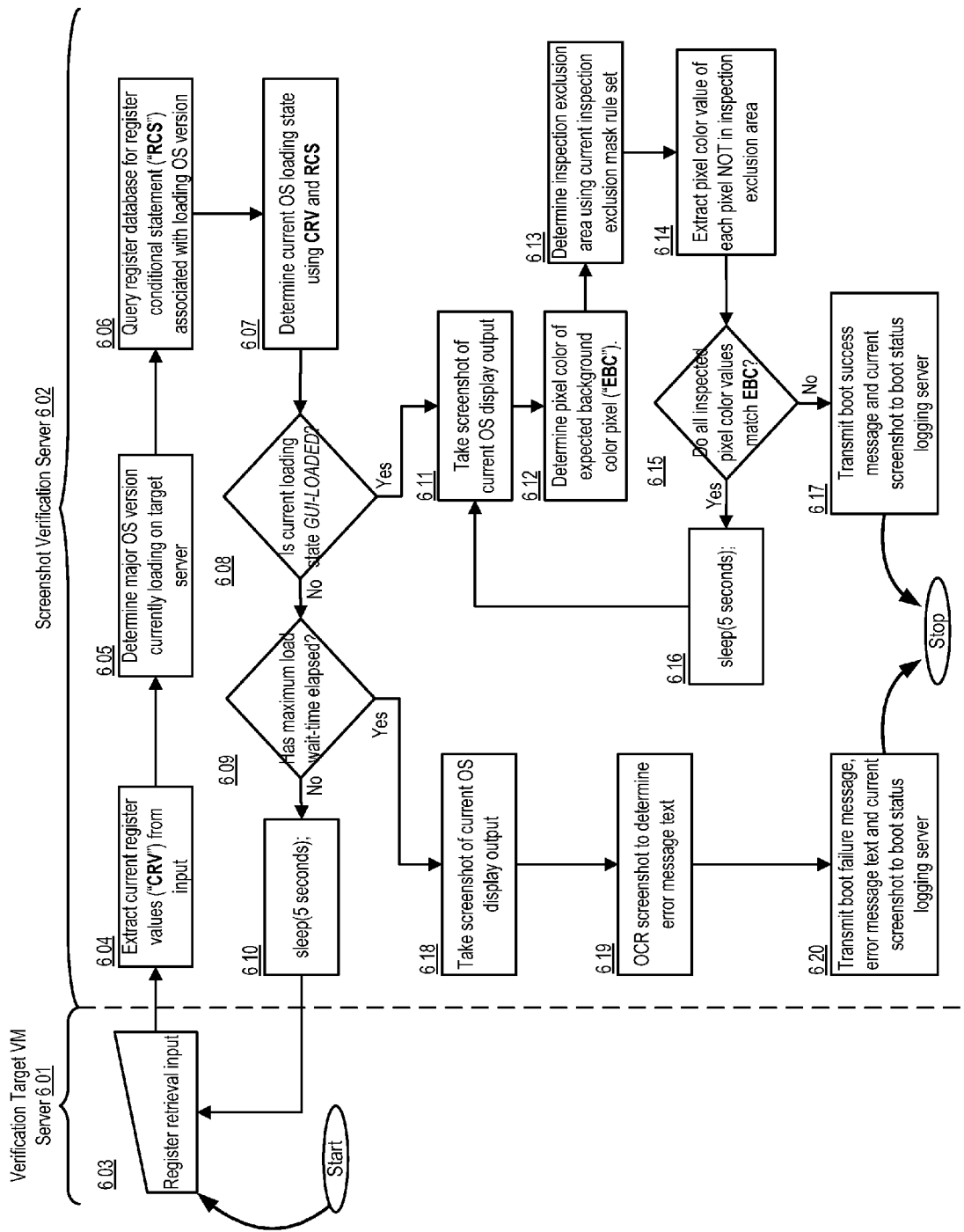
FIG. 6 shows an example logic flow illustrating aspects of determining operating system loading screen state using CPU register values, e.g., an example OBC Component, in one implementation of the CRV operation.

FIG. 6 shows an example logic flow illustrating aspects of determining operating system loading screen state using CPU register values, e.g., an example OBC Component, in one implementation of the CRV operation. In one embodiment, a server that is being monitored during a boot sequence, e.g., a verification target virtual machine server 601, can provide a register retrieval input 603 to a screenshot verification server 602. The screenshot verification server 602 can extract the current register values from the input 604. The values, and/or metadata provided with the retrieval input can be used to determine the operating system version that is currently being loaded on the verification target server, e.g. 605. In one embodiment, the screenshot verification server can query a register database for a conditional statement associated with the currently loading operating system version 606. As discussed herein, the conditional statement can be evaluated in conjunction with current register values or a history of register values to determine with a given probability the current state that an operating system is in during a boot sequence. In other embodiments, the conditional statements can further be used to determine various states with respect to a server that is not currently executing a boot sequence. For example, the embodiments discussed herein can similarly be employed to determine, for example, an application that the server is currently executing, the capabilities of the server, whether the server is currently transmitting or receiving data over a network connection, and/or the like. In one embodiment, the screenshot verification server 602 can determine if the verification target server is currently in a successfully booted state 608. If the server has not yet reached a successfully booted state, the screenshot verification server can further determine if a quantum representing the maximum booting wait time has elapsed, e.g. 609. The maximum load wait time can represent an upper bounds on the amount of time the screenshot verification server should wait for a successful boot result from the conditional statement evaluation before concluding that the verification target server is in a boot failure state. In other embodiments, the failure state can be determined by utilizing an alternate conditional statement that represents one or more failure states of a target server and/or target operating system. If the maximum load wait time has not elapsed, e.g. 609, screenshot verification server 602 can pause the procedure for a given time quantum such as five seconds 610. In some embodiments, the current register values can then be read again after the expiration of the sleep time quantum. In one embodiment, if the conditional statement evaluation determines that the current operating system loading state is that of successfully loaded, e.g. 608, then a screenshot of the current operating system display output 610 can be taken. In some embodiments, the display output can represent the visual output that a user would experience if they were observing a monitor connected to the currently booting verification target server. In other embodiments, the display output can instead be one or more messages from the verification target server such as can be applicable when a headless server logs its boot output to a log file. An example executable command suitable for taking a screenshot of an operating system display output is:

VBoxManage controlvm VM_NAME screenshotpng FILENAME.png

In one embodiment, the pixel color of an expected background pixel can be determined 612. The background pixel can be located at a given location which can depend on the server type, the operating system major version, the operating system incremental version, and/or the like. In one embodiment, an inspection exclusion area can be determined using an inspection exclusion mask rule set. An inspection exclusion mask rule set can represent an area of an operating system display output that is not to be examined in order to determine a current operating system boot state. In one embodiment, the color value of pixels that do not fall in the inspection exclusion area can be extracted 614, and compared against the expected background pixel color previously determined 615. If all inspected values match the expected background pixel color the procedure can pause for a time quantum such as five seconds 616. In other embodiments, if the color values of each inspected pixel do not match the expected background pixel color, e.g. 615, then a boot success message as well as a screenshot showing the current operating system display output can be sent to a boot status logging server 617. In one embodiment, if the current loading state of a verification target server is not determined to be in a success state based on the current register values and the applicable conditional statement, e.g. 608, and the maximum boot loading wait time has elapsed, e.g. 609, then a screenshot of the current operating system display output can be taken 618.

In one embodiment, the screenshot can be processed by an optical character recognition component in order to determine the text of any error messages that can be displayed on the current operating system display output, e.g. 619. An open source program suitable for performing optical character recognition is Tesseract. An example Tesseract command suitable for extracting error message text from an operating system display output screen capture is:

```
//build tesseract command
$cmdOcr = 'tesseract ' . $rootDir . $imgFileToProcessRoot . '-' .
$i . '.tif ' . $rootDir . $imgFileToProcessRoot . '-' . $i . '
nobatch letters';
//ocr screenshot output
exec($cmdOcr);
```

In one embodiment, screenshot verification server 602 can then prepare a boot failure message including the extracted text of an error message, a current screenshot of the operating system display output, and/or the like and forward the boot failure message to a boot status logging server, e.g. 620.

FIG. 7 shows some examples of entropies calculated from a set of N samples comprising register values of a CPU over time, in one implementation of the CRV operation. In some embodiments, the amount of information contained in the CPU registers which can be used to reveal the state in which a CPU remains can randomly vary over time. In these cases, the Shannon entropy can be utilized to calculate the amount of information contained by the CPU registers over time when the CPU remains in a stable state. The Shannon entropy is defined by:

$$H = -\Sigma_{x=n}^{n} p(x) \log p(x)$$

Where p is the probability of a determined value in a register, and n is the number of different outcomes or values a register can contain for a given CPU state. In some embodiments, the Shannon entropy can be calculated for the values contained in a sample of registers over time. An example code to calculate the Shannon entropy for a given set of register values, substantially in the form of PHP scripting language is provided below:

```
<?php
/**
* Contains \Entropy.
*/
namespace \Entropy;
class Entropy
{
    public $set = array( );
    public $samples = 0;
    public $valueFrequencies = array( );
    public $valueProbabilities = array( );
    public $uniqueValues = 0;
    public $entropy = 0.0;
    public $maxEntropy = 0.0;
    public $ratio = 0.0;
    public function ___construct($data) {
        $this->set = $data;
        $this->samples = count($this->set);
        $this->populateValueFrequencies( );
        $this->uniqueValues = count($this->valueFrequencies);
        $entropy = 0;
        foreach ($this->valueFrequencies as $value => $freq) {
            $this->valueProbabilities[$value] = $freq / $this-
>samples;
            $entropy += $this->valueProbabilities[$value] *
log($this->valueProbabilities[$value], 10);
        }
        if ($entropy != 0) {
            $this->entropy = -1.0 * $entropy;
            $this->maxEntropy = log($this->uniqueValues, 10);
            $this->ratio = $this->entropy / $this->maxEntropy;
        }
    }
    private function populateValueFrequencies( ) {
        $valueFrequencies = array( );
        for ($i = 0; $i < $this->samples; $i++) {
            $valueFrequencies[$this->set[$i]]++;
        }
        $this->valueFrequencies = $valueFrequencies;
}}
```

Referring back to FIG. 7, a collection of samples containing register values over time taken while a computer is in a stable state are shown e.g., 701. Given the set of samples 701 entropy values can be calculated in a plurality of ways to inform the CRV of the amount of information carried by a register during a time quantum. In some embodiments the entropy values can be calculated as a function of all the registers comprised in a sample e.g., 702. Alternatively, in some embodiments, the entropy can be calculated as a function of the observed register values for individual registers over time. For example, h(rax) 703 is the entropy calculated as a function of the values contained in the register rax over the period period of time corresponding to the time when SAMPLE1 to SAMPLEN where taken e.g., 705. Moreover, an additional global entropy value can equally be calculated as a function of the entropy values calculated for each register over time for example h(global) 704.

It will readily evident to a person of the ordinary skill in the art that a plurality of additional methods exist to calculate entropy values from registers' content captured over time can be employed to deduce the amount of information carried out by a register when a computer is in a stable state, such methods can comprise computations which include but are not limited to sorting the entropy values before calculating a global entropy, associating a weight value to a subset of entropy values before calculating a global entropy and other similar computational methods.

Figure 8A:
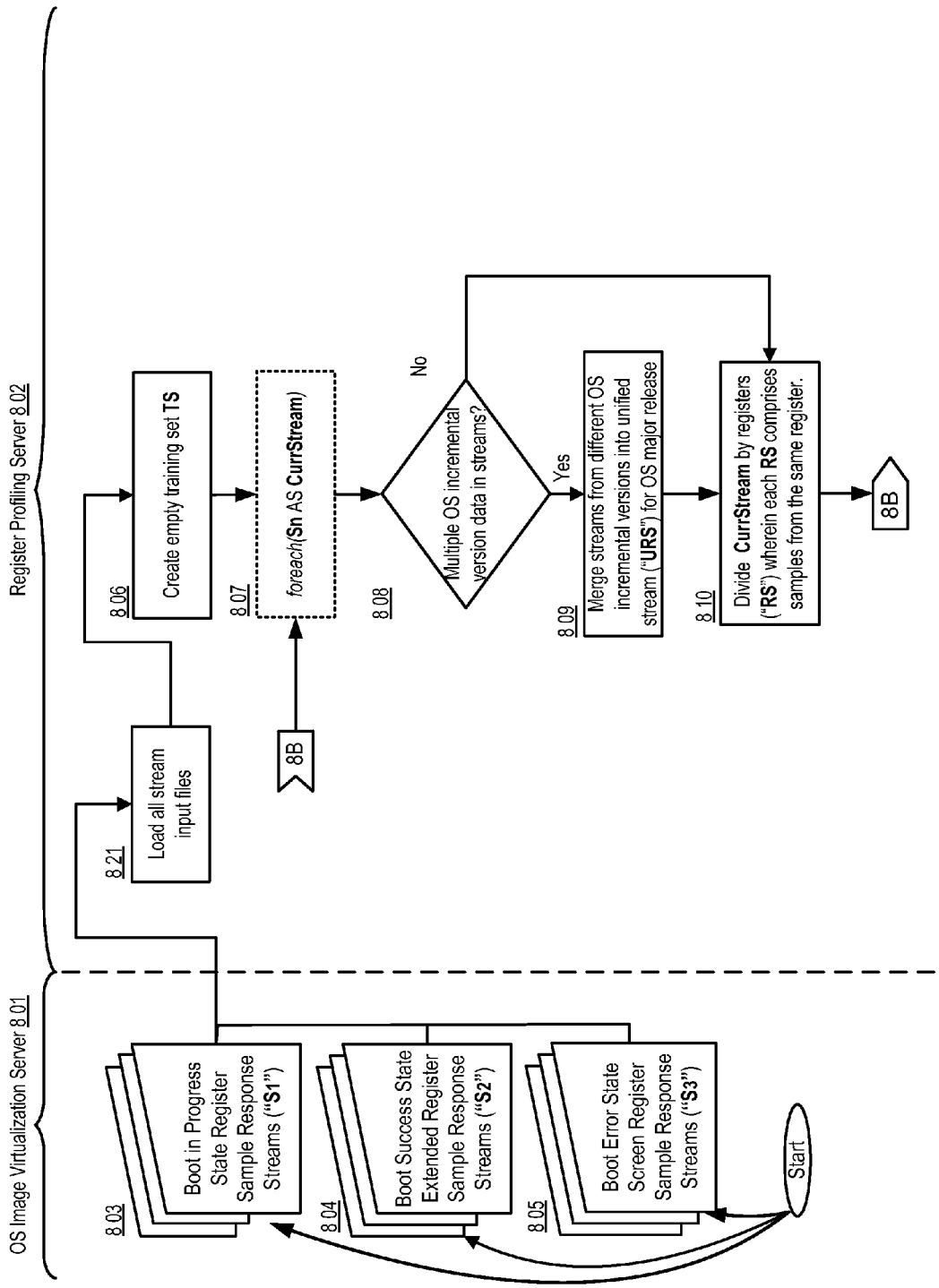

FIGS. 8A-B show an additional example of a logic flow illustrating generating OS register profiles and screenshot conditional statements, e.g., an alternative example RPS Component, in one implementation of the CRV operation. In one embodiment, operating system image virtualization server 801 can receive inputs such as boot in progress state register sample response streams, e.g. 803, boot success state register sample response streams, e.g. 804, boot error state register sample response streams, e.g., 805, and/or the like. The inputs can be transmitted to register profiling server 802, which can load the stream input files 821. Thereafter, a training set repository is created 806 to contain the data entries that will be eventually fed into a machine learning algorithm. Once the repository for the training set has been created the register profiling server can begin computing operations for each of the loaded streams e.g., 807. In some embodiments, the input streams can contain data taken from computers running multiple incremental versions of operative systems e.g. 808. In such a case a preprocessing operation can be performed to merge the data from the multiple operative versions e.g., 809 thenceforth, each stream is divided into record sets wherein each record set comprises the values obtained overtime for a particular CPU register while the computer was in a stable determined state e.g., 810.

In some embodiments, for each of the record sets e.g., 811, the register profile server can divide the data in the sets into subsets containing an equal number of values e.g., 812. Thereafter, for each of the computed subsets e.g., 813, an entropy value is calculated as a function or all the values contained in the subset and a training set record entry can be constructed comprising the calculated entropy value, the computer state associated with the values in the subset and the register from where the values where taken e.g., 814. When all the subsets have been exhausted e.g., 815 for each of the registers comprised in a stream e.g., 816 and all the streams in the loaded streams 817 have been processed, the training set contains all the necessary training data to be fed into a machine learning algorithm e.g., 822. An illustrative example of the training data contained by the training set 818 in the form of (Entropy, State, Register) is provided below:

(0.246022, S1, RAX)
(0.246022, S1, SS)
(1.160223, S3, r9)
(0.141182, S1, RIP)
(0.000000, S2, EAX)
(0.525657, S2, EAX)

A person of the ordinary skill in the art can appreciate that the classifier can be similarly trained to differentiate between more than aformentioned states, and a that a more comprehensive classifier can be generated by entering training data comprising other states including but not limited to BIOS loaded state, network interface card (NIC) loaded state and the like states.

In some embodiments, the machine learning algorithm can be executed; examples of such machine algorithms include ID3, and C4.5 learning algorithms e.g., 819 however, it can be appreciated that other type of machine learning algorithms can be utilized in order to generate other types of intelligent classifier. An example pseudocode to generate a classifier in the form of a decision tree utilizing the C4.5 algorithm is provided below

```
C4.5(Training Set TS)
    Instantiate decision tree EBDT
    If TS is "pure" OR other stopping criteria met then
        Terminate
    endif
    for all attribute a in the training set TS
        Compute information-theoretic criteria if we split
            on a
    end for
    abest = Best attribute according to above computed
    criteria.
    EBDT = Create decision node that tests abest in the root.
    TSv = Induced sub-datasets from TS based on abest.
    For all Tsv do
        DTv = C4.5(TSv)
        Attach DTv to the corresponding branch of the tree
        EBDT
    EndFor
Return (EBDT)
```

In some embodiments once the machine learning algorithm has been successfully executed the algorithm can provide a classifier in the form of an entropy based decision tree e.g., 820 other type of classifiers based on different types of data structures and or logic can also be generated from the machine learning algorithm 822. An example fragment of an entropy based decisition tree implementation, substantially in the form of PHP scripting language is provided below:

```php
<?php
/**
/**
 * Determine whether a server running Windows has reached
 * a boot success or boot in progress state.
 */
// CPU register
// values were recorded during boot and at the GUI
switch( $os ) {
case 'Windows2000':
    if( $registers['cr4'] == '000006d1' ) {
    if( $registers['edx'] != '000003ce' ) {
    return true;
    } }
```

```
else {
if( $registers['cr4'] == '00000691' && $registers['ebx'] ==
'ffdff000' ) {
return true;
} }
break;
case 'WindowsXP':
if( $registers['ebx'] == 'ffdffc70' ) {
return true;
} else {
if( $registers['cr4'] == '000006d9' ) {
if( $registers['eax'] != '00000000' ) {
return true;
} }
else {
if( $registers['cr4'] == '000006f9' &&
$registers['cr3'] != '00733000' &&
$registers['ecx'] != '000003ce' &&
$registers['cr3'] != '0072d000' &&
$registers['ebx'] != '00000000' &&
$registers['edx'] != '000003b6' ) {
return true;
} } }
break;
case 'WindowsXP_64':
if( array_key_exists( 'eax', $registers ) ) {
return false; // Windows hasn't loaded if it's still in 32-bit
mode.
}
if( $registers['gs'] != '0000' &&
$registers['rax'] != '000000000000d009' &&
$registers['rbx'] != '0000000000000000' &&
$registers['r8'] != 'ffff8000117b300' &&
$registers['rbx'] != 'ffff80001174180' ) {
return true;
}
break;
case 'Windows2003':
if( $registers['ecx'] == 'ffdffee0' ) {
return true;
}
else {
if( $registers['cr4'] == '00000699' ) {
if( $registers['edi'] != '897a4318' &&
$registers['ecx'] != '000003ce' &&
$registers['edi'] != '89ba1da0' ) {
if( $registers['ebx'] == 'ffdff000' ) {
return true;
}
elseif( $registers['edx'] != '00000000' ) {
return true;
} } }
elseif( $registers['cr4'] == '000006b9' &&
$registers['cr2'] != 'e15f5000' &&
$registers['cr3'] != '00e60000' &&
$registers['cr3'] != '005e1000' &&
$registers['ecx'] != '000003ce' ) {
return true;
} }
break;
.
.
.
case 'Windows7_64':
if( array_key_exists('eax',$registers) ) {
return false; // Windows hasn't loaded if it's still in 32-bit
mode.
}
if( $registers['rdi'] == '0000000000000001' ) {
if( $registers['r9'] != '0000000000000001' &&
$registers['ss'] != '0000' ) {
if( $registers['cr2'] == 'ffff900c1c1b000' ) {
return true;
}
```

```
else {
if( $registers['rax'] != '000000000001f793' ) {
return true;
}}}}else {
if( $registers['cr3'] != '00187000' &&
$registers['cr3'] != '799a3000' ) {
return true;
} } }
break;
}
return false; }
```

Figure 9:
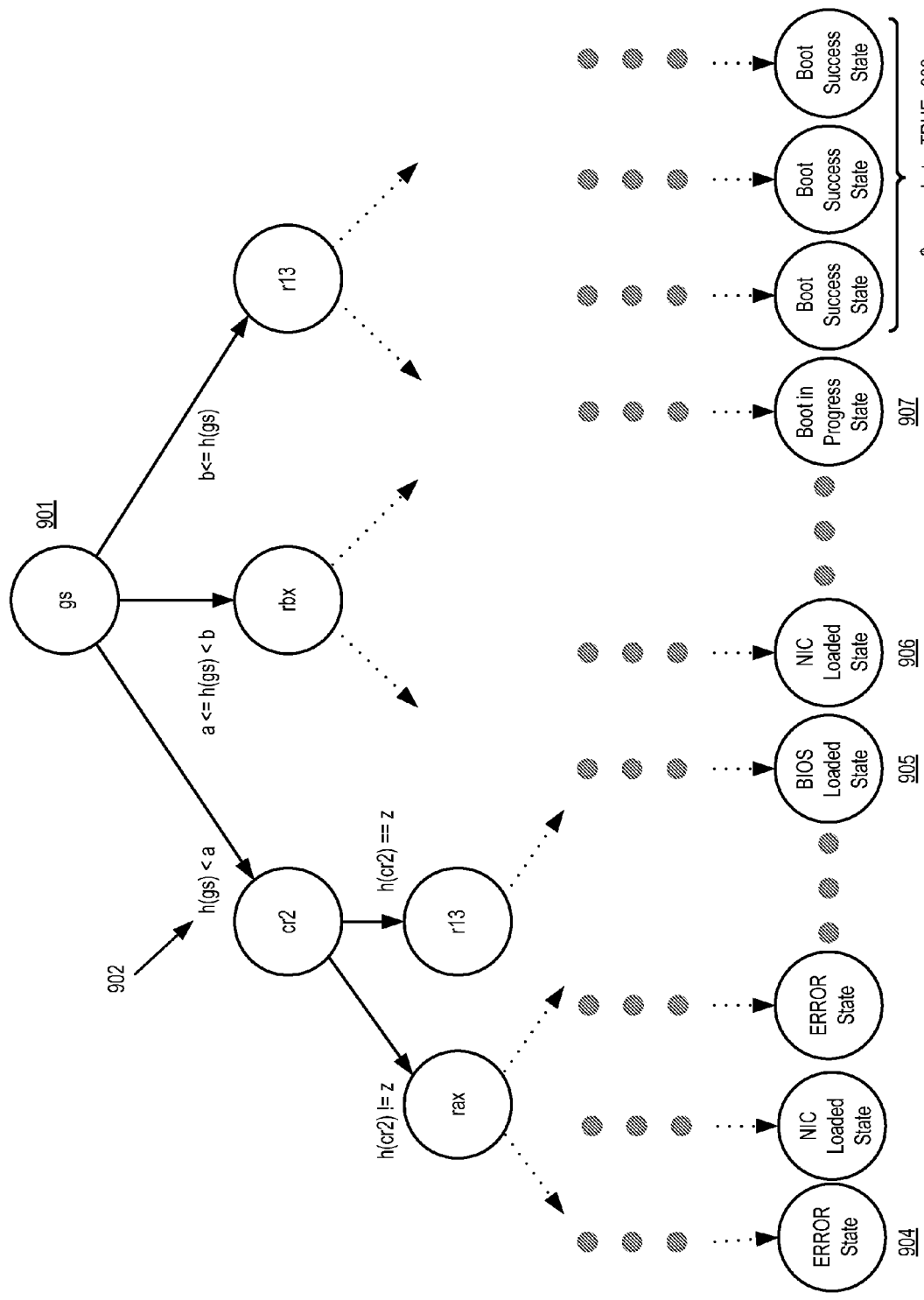
FIG. 9 shows an example of an entropy based decision tree ("EBDT") generated to capture a computer screenshot at a determined computer state, in one implementation of the CRV operation.

FIG. 9 shows an example of an entropy based decision tree generated to capture a computer screenshot at a determined computer state, in one implementation of the CRV operation. In some embodiments an entropy based decision tree can be generated having at the root node, a node corresponding to the CPU register that allows the greatest gain of information i.e., the CPU record which is the most fitted to differentiate between for example, an error state 904, a BIOS loaded state 905, a NIC loaded 906, a boot in progress state 907 and a boot success state 908 is the node associated with the CPU register gs e.g., 901. By choosing the most fitted node to differentiate between different states iteratively results in a decision tree that can discern between states utilizing the optimal path from node to leaf node i.e., to a determined state. The traversal of the entropy based decision tree through the edges or branches depends on the entropy values of the registers that are been evaluated to be classified a CPU state. In some embodiments, once a tested set of registers reach the success boot state, the CRV controller can take a screenshot to provided evidence of the reached state e.g., 908.

CRV Controller

Figure 10:
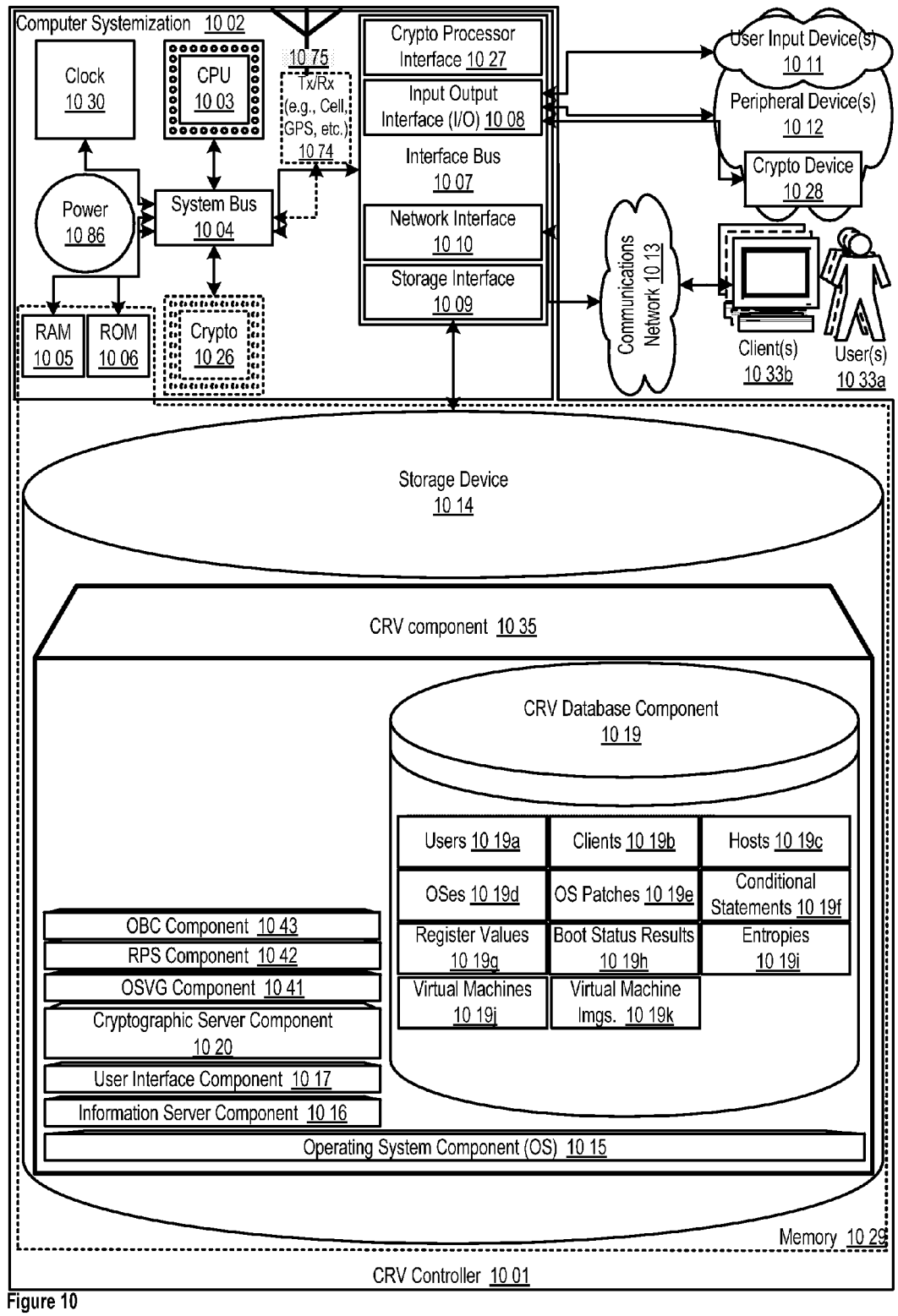
FIG. 10 shows a block diagram illustrating aspects of an exemplary embodiment of a CRV user interface controller, in one embodiment.

FIG. 10 shows a block diagram illustrating embodiments of a CRV controller. In this embodiment, the CRV controller 1001 may serve to aggregate, process, store, search, serve, identify, instruct, generate, match, and/or facilitate interactions with a computer through various technologies, and/or other related data. The CRV can, for example, be configured such that the various components described herein execute on the user 201 client device, the OS image visualization server 202, the register profiling server 204, the user 301 client device, the verification target VM server 302, the screenshot verification server 303 and the boot status log server 304. Because each component of the CRV may be distributed, as described below, the user client device 201, the OS image visualization server 202, the register profiling server 204, the user 301 client device, the verification target VM server 302, the screenshot verification server 303 and the boot status log server 304 can perform portions of the program logic assigned to them or portions of the program logic normally assigned to the other. In another example, the CRV OSVG Component 1041 (described above with respect to FIG. 4), the CRV RPS Component 1042 (described with respect to FIG. 5 and FIGS. 8Aa and 8B) and the CRV OBC Component 1043 (described with respect to FIG. 6) can execute on one or more local servers. In an alternative configuration, the CRV OSVG Component 1041, he CRV RPS Component 1042, and the CRV OBC Component 1043 can be installed on one or more remote servers and provide services to user 201 client device and user 301 client device via the networked program execution capabilities described below.

Typically, users, which may be people and/or other systems, may engage information technology systems (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CRV controller 1001 may be connected to and/or communicate with entities such as, but not limited to: one or more users from user input devices loll; peripheral devices 1012; an optional cryptographic processor device 1028; and/or a communications network 1013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CRV controller 1001 may be based on computer systems that may comprise, but are not limited to, components such as: a computer systemization 1002 connected to memory 1029.

Computer Systemization

A computer systemization 1002 may comprise a clock 1030, central processing unit ("CPU(s)" and/or "processor(s)" (these terms are used interchangeable throughout the disclosure unless noted to the contrary)) 1003, a memory 1029 (e.g., a read only memory (ROM) 1006, a random access memory (RAM) 1005, etc.), and/or an interface bus 1007, and most frequently, although not necessarily, are all interconnected and/or communicating through a system bus 1004 on one or more (mother)board(s) 1002 having conductive and/or otherwise transportive circuit pathways through which instructions (e.g., binary encoded signals) may travel to effectuate communications, operations, storage, etc. The computer systemization may be connected to a power source 1086; e.g., optionally the power source may be internal. Optionally, a cryptographic processor 1026 and/or transceivers (e.g., ICs) 1074 may be connected to the system bus. In another embodiment, the cryptographic processor and/or transceivers may be connected as either internal and/or external peripheral devices 1012 via the interface bus I/O. In turn, the transceivers may be connected to antenna(s) 1075, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CRV controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CRV controller and beyond through various interfaces. Should processing requirements dictate a greater amount speed and/or capacity, distributed processors (e.g., Distributed CRV), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the CRV may be achieved by implementing a microcontroller such as CAST's R8051XC2microcontroller; Intel's MCS 51 (i.e., 8051 microcontroller); and/or the like. Also, to implement certain features of the CRV, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CRV component collection (distributed or otherwise) and/or features may be implemented via the microprocessor and/or via embedded components; e.g., via ASIC, coprocessor, DSP, FPGA, and/or the like. Alternately, some implementations of the CRV may be implemented with embedded components that are configured and used to achieve a variety of features or signal processing.

Depending on the particular implementation, the embedded components may include software solutions, hardware solutions, and/or some combination of both hardware/software solutions. For example, CRV features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CRV features. A hierarchy of programmable interconnects allow logic blocks to be interconnected as needed by the CRV system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CRV may be developed on regular FPGAs and then migrated into a fixed version that more resembles ASIC implementations. Alternate or coordinating implementations may migrate CRV controller features to a final ASIC instead of or in addition to FPGAs. Depending on the implementation all of the aforementioned embedded components and microprocessors may be considered the "CPU" and/or "processor" for the CRV.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the CRV thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1010 may accept, communicate, and/ or connect to a communications network 1013. Through a communications network 1013, the CRV controller is accessible through remote clients 1033*b* (e.g., computers with web browsers) by users 1033*a*. Network interfaces may employ connection protocols such as, but not limited to: direct connect, Ethernet (thick, thin, twisted pair 10/100/ 1000 Base T, and/or the like), Token Ring, wireless connection such as IEEE 802.11a-x, and/or the like. Should processing requirements dictate a greater amount speed and/or capacity, distributed network controllers (e.g., Distributed CRV), architectures may similarly be employed to pool, load balance, and/or otherwise increase the communicative bandwidth required by the CRV controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: audio: analog, digital, monaural, RCA, stereo, and/or the like; data: Apple Desktop Bus (ADB), IEEE 1394 a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1011 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1012 may be connected and/or communicate to I/O and/or other facilities of the like such as network interfaces, storage interfaces, directly to the interface bus, system bus, the CPU, and/or the like. Peripheral devices may be external, internal and/or part of the CRV controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CRV controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the CRV controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the CRV controller and/or a computer systemization may employ various forms of memory 1029. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1029 may contain a collection of program and/or database components and/or data such as, but not limited to: operating system component 1015; information server component 1016; user interface component 1017; CRV database component 1019; cryptographic server component 1020; OSVG component 1041, RPS component 1042, OBC component 1043; and/or the like (i.e., collectively a component collection). The aforementioned components may be incorporated into (e.g., be sub-components of), loaded from, loaded by, or otherwise operatively available to and from the CRV component(s) 1035.

Any component may be stored and accessed from the storage devices and/or from storage devices accessible through an interface bus. Although program components such as those in the component collection, typically, are stored in a local storage device 1014, they may also be loaded and/or stored in other memory such as: remote "cloud" storage facilities accessible through a communications network; integrated ROM memory; via an FPGA or ASIC implementing component logic; and/or the like.

Operating System Component

The operating system component 1015 is an executable program component facilitating the operation of the CRV controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, OpenBSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the CRV controller to communicate with other entities through a communications network 1013. Various communication protocols may be used by the CRV controller as a subcarrier transport mechanism for interaction, such as, but not limited to: multicast, TCP/IP, UDP, unicast, and/or the like.

Information Server Component

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CRV controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CRV database component 1019, operating system component 1015, other program components, user interfaces, and/or the like.

Access from the Information Server Component 1016 to the CRV database component 1019 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CRV. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CRV as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating system component 1015, other program components, and/or the like. The user interface may contain, communicate, generate, obtain, and/or provide program component, system, user, and/or data communications, requests, and/or responses.

Cryptographic Server Component

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the CRV may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CRV component to engage in secure transactions if so desired. The cryptographic component facilitates the secure accessing of resources on the CRV and facilitates the access of secured resources on remote systems; i.e., it may act as a client and/or server of secured resources. Most frequently, the cryptographic component communicates with information server component 1016, operating system component 1015, other program components, and/or the like. The cryptographic component may contain, communicate, generate, obtain, and/or provide program component, system, user, and/or data communications, requests, and/or responses.

CRV Database Component

The CRV database component 1019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CRV database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-k*. A Users table 1019*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a CRV. A Clients table 1019*b* may include fields such as, but not limited to: client_id, client_name, client_ip, client_type, client_model, operating_system, os_version, app_installed_flag, and/or the like. A Hosts table 1019*c* may include fields such as, but not limited to: host_id, ip_address, client_id, user_id, permission_level, boot_state, and/or the like. An OSes table 1019*d* may include fields such as, but not limited to: os_id, os_name, major_version_num, manufacturer, release_date, iso_file, and/or the like. An OS Patches table 1oi9*e* may include fields such as, but not limited to: os_patch_id, os_id, patch_number, release_date, patch_location, iso_file, and/or the like. A Conditional Statements table 1019*f* may include fields such as, but not limited to: conditional_statement_id, os_id, os_patch_id, decision_tree, statement_contents, and/or the like. A Register Values table 1019*g* may include fields such as, but not limited to: register_value_id, register_name, register_value, os_id, sample_timestamp, and/or the like. A Boot Status Results table 1019*h* may include fields such as, but not limited to: boot_status_result_id, status_value, os_id, host_id, status_timestamp and/or the like. An Entropies table 1019*i* may include fields such as, but not limited to: entropy_id, register_name, entropy_value, os_id, sample_timestamp, machine_state and/or the like. A Virtual Machines table 1019*j* may include fields such as, but not limited to: vm_id, vm_name, vm_hard_drive_file, vm_last_booted_timestamp and/or the like. A Virtual Machine Images table 1019*k* may include fields such as, but not limited to: vm_image_id, vm_iso_file, vm_image_name, vm_image_location, last_updated_timestamp and/or the likeIn one embodiment, the CRV database component may interact with other database systems. For example, when employing a distributed database system. In such an embodiment, queries and data access by any CRV component may treat the combination of the CRV database component results and results from a second segment in a distributed database system as an integrated database layer. Such a database layer may be accessed as a single database entity, for example through CRV database component 1019, by any CRV component.

In one embodiment, user programs may contain various user interface primitives, which may serve to update the CRV. Also, various accounts may require custom database tables depending upon the environments and the types of clients the CRV may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019*a-k*. The CRV may be configured to keep track of various settings, inputs, and parameters via database controllers.

The CRV database may communicate to and/or with other components in a component collection, including itself, and/or facilities of the like. Most frequently, the CRV database communicates with the CRV component, other program components, and/or the like. The database may contain, retain, and provide information regarding other nodes and data.

CRV Component

The CRV component 1035 is a stored program component that is executed by a CPU. In one embodiment, the CRV component incorporates any and/or all combinations of the aspects of the CRV that was discussed in the previous figures. As such, the CRV affects accessing, obtaining and the provision of information, services, transactions, and/or the like across various communications networks. The features and embodiments of the CRV discussed herein increase network efficiency by reducing data transfer requirements the use of more efficient data structures and mechanisms for their transfer and storage. As a consequence, more data may be transferred in less time, and latencies with regard to data processing operations and transactions, are also reduced. In many cases, such reduction in storage, transfer time, bandwidth requirements, latencies, etc., will reduce the capacity and structural infrastructure requirements to support the CRV's features and facilities, and in many cases reduce the costs, energy consumption/requirements, and extend the life of CRV's underlying infrastructure; this has the added benefit of making the CRV more reliable. Similarly, many of the features and mechanisms are designed to be easier for users to use and access, thereby broadening the audience that may enjoy/employ and exploit the feature sets of the CRV; such ease of use also helps to increase the reliability of the CRV. In addition, the feature sets include heightened security as noted via the Cryptographic components 1020, 1026, 1028 and throughout, making access to the features and data more reliable and secure.

The CRV component can transform register retrieval requests, and/or the like, via various components described herein, into boot success messages and screenshot captured responses. In one embodiment, the CRV component 1035 takes inputs (e.g., create OS variant input 205, pre-OS-loaded input 215, OS loaded input 218, OS loaded signal 219, pre-OS loaded signal 216, OS screenshot register profiler launch request 210, create variants message 206, image request 207, launch OS request 211, boot screen register sample request 213, GUI loaded screen extended register sample request 220, boot VM server input 305, boot server request message 306, boot notification message with OS metadata 308, register retrival request 309, screenshot capture request 312 and/or the like) etc., and transforms the inputs via various components (e.g., OSVG Component 1041, RPS Component 1042, OBC Component 1043 and/or the like), into outputs (e.g., image response 208, launch OS response 212, boot screen register sample response stream 214, GUI loaded screen extended register sample response stream 221, register retrieval response 310, screen capture response 313, boot failure message 315*a*, boot success message 315*b*, and/or the like).

The CRV component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the CRV server employs a cryptographic server to encrypt and decrypt communications. The CRV component may communicate to and/or with other components in a component collection, including itself, and/or facilities of the like. Most frequently, the CRV component communicates with the CRV database component 1019, operating system component 1015, other program components, and/or the like. The CRV may contain, communicate, generate, obtain, and/or provide program component, system, user, and/or data communications, requests, and/or responses.

Distributed CRV Components

The structure and/or operation of any of the CRV node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CRV controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http://... Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment, and requirements of system deployment.

Additional embodiments of the CRV can include:

1. A method for determining when to capture a screenshot of a virtual machine's display output by using the entropy of the virtual machine's CPU registers, comprising:
   A) retrieving, via a processor, from a hypervisor providing virtualization services to the virtual machine, a plurality of virtual CPU register values for at least one virtual CPU register of the virtual machine;
   B) calculating, for the at least one virtual CPU register, an at least one register entropy value based on the plurality of virtual CPU register values;
   C) determining, via the processor, using the at least one register entropy value, a first boot state value for the virtual machine; and
   D) initiating an automated virtual machine display output capture, when the first boot state value is equal to a second boot state value, to generate a screenshot image file representing the virtual machine display output.
2. The method of embodiment 1, wherein the first boot state value and/or the second boot state value indicate one of the following virtual machine states:
   a boot success state;
   a boot in-progress state; and
   a boot error state.
3. The method of embodiment 2, wherein the boot success state is present when an operating system running on the virtual machine has successfully finished booting.
4. The method of embodiment 2, wherein the boot in-progress state is present when an operating system running on the virtual machine is currently booting.
5. The method of embodiment 2, wherein the boot error state is present when an operating system running on the virtual machine is experiencing an error condition.
6. The method of embodiment 1, wherein A), B), and C) are repeated sequentially while the first boot state value indicates a boot in-progress state and the second boot state value indicates a boot success state.
7. The method of embodiment 6, wherein the repeating of A), B), and C) automatically terminates upon the elapsing of a time quantum.
8. The method of embodiment 7, wherein the time quantum is the estimated maximum time for an operating system to boot on the virtual machine.
9. The method of embodiment 7, wherein the elapsing of the time quantum indicates that the virtual machine is in a boot error state.
10. The method of embodiment 9, additionally comprising:
    electronically capturing, when the virtual machine is in a boot error state, a screenshot image file representing the virtual machine display output;
    performing, on the screenshot image file representing the virtual machine display output of the booting virtual machine in a boot error state, automated optical character recognition in order to determine a boot error message;
    generating an error report including the determined boot error message; and
    transmitting the error report to an administrator user as an indication of an unsuccessful backup image verification.
11. The method of embodiment 1, wherein the virtual machine is in communication with a virtual data store.
12. The method of embodiment 11, wherein the virtual data store content comprises a bootable operating system.
13. The method of embodiment 11, wherein the virtual data store content comprises the content of a backup image file.
14. The method of embodiment 13, wherein the backup image file is a representation of the block-level data stored on a source computer block storage device, wherein the source computer block storage device previously underwent a backup procedure in order to generate the backup image file.
15. The method of embodiment 13, additionally comprising:
    providing the virtual data store to the hypervisor as a startup boot disk for the virtual machine.

Additional embodiments of the CRV can include:

1. An apparatus to determine when to capture a screenshot of a virtual machine's display output by calculating the entropy of the virtual machine's CPU registers, comprising:
   a memory; and
   a processor disposed in communication with said memory, and configured to issue a plurality of processing instructions stored in the memory, wherein the processor issues instructions to:
   A) retrieve, via a processor, from a hypervisor providing virtualization services to the virtual machine, a plurality of virtual CPU register values for at least one virtual CPU register of the virtual machine;
   B) calculate, for the at least one virtual CPU register, an at least one register entropy value based on the plurality of virtual CPU register values;
   C) determine, via the processor, using the at least one register entropy value, a first boot state value for the virtual machine; and D) initiate an automated virtual machine display output capture, when the first boot state value is equal to a second boot state value, to generate a screenshot image file representing the virtual machine display output.
2. The apparatus of embodiment 1, wherein the first boot state value and/or the second boot state value indicate one of the following virtual machine states:
a boot success state;
a boot in-progress state; and
a boot error state.
3. The apparatus of embodiment 2, wherein the boot success state is present when an operating system running on the virtual machine has successfully finished booting.
4. The apparatus of embodiment 2, wherein the boot in-progress state is present when an operating system running on the virtual machine is currently booting.
5. The apparatus of embodiment 2, wherein the boot error state is present when an operating system running on the virtual machine is experiencing an error condition.
6. The apparatus of embodiment 1, wherein A), B), and C) are repeated sequentially while the first boot state value indicates a boot in-progress state and the second boot state value indicates a boot success state.
7. The apparatus of embodiment 6, wherein the repeating of A), B), and C) automatically terminates upon the elapsing of a time quantum.
8. The apparatus of embodiment 7, wherein the time quantum is the estimated maximum time for an operating system to boot on the virtual machine.
9. The apparatus of embodiment 7, wherein the elapsing of the time quantum indicates that the virtual machine is in a boot error state.
10. The apparatus of embodiment 9, additionally comprising instructions to:
electronically capture, when the virtual machine is in a boot error state, a screenshot image file representing the virtual machine display output;
perform, on the screenshot image file representing the virtual machine display output of the booting virtual machine in a boot error state, automated optical character recognition in order to determine a boot error message;
generate an error report including the determined boot error message; and
transmit the error report to an administrator user as an indication of an unsuccessful backup image verification.
11. The apparatus of embodiment 1, wherein the virtual machine is in communication with a virtual data store.
12. The apparatus of embodiment 11, wherein the virtual data store content comprises a bootable operating system.
13. The apparatus of embodiment 11, wherein the virtual data store content comprises the content of a backup image file.
14. The apparatus of embodiment 13, wherein the backup image file is a representation of the block-level data stored on a source computer block storage device, wherein the source computer block storage device previously underwent a backup procedure in order to generate the backup image file.
15. The apparatus of embodiment 13, additionally comprising instructions to:
provide the virtual data store to the hypervisor as a startup boot disk for the virtual machine.

Additional embodiments of the CRV may include:
1. A non-transitory medium to determine when to capture a screenshot of a virtual machine's display output by calculating the entropy of the virtual machine's CPU registers, storing instructions comprising:
A) retrieve, via a processor, from a hypervisor providing virtualization services to the virtual machine, a plurality of virtual CPU register values for at least one virtual CPU register of the virtual machine;
B) calculate, for the at least one virtual CPU register, an at least one register entropy value based on the plurality of virtual CPU register values;
C) determine, via the processor, using the at least one register entropy value, a first boot state value for the virtual machine; and
D) initiate an automated virtual machine display output capture, when the first boot state value is equal to a second boot state value, to generate a screenshot image file representing the virtual machine display output.
2. The non-transitory medium of embodiment 1, wherein the first boot state value and/or the second boot state value indicate one of the following virtual machine states:
a boot success state;
a boot in-progress state; and
a boot error state.
3. The non-transitory medium of embodiment 2, wherein the boot success state is present when an operating system running on the virtual machine has successfully finished booting.
4. The non-transitory medium of embodiment 2, wherein the boot in-progress state is present when an operating system running on the virtual machine is currently booting.
5. The non-transitory medium of embodiment 2, wherein the boot error state is present when an operating system running on the virtual machine is experiencing an error condition.
6. The non-transitory medium of embodiment 1, wherein A), B), and C) are repeated sequentially while the first boot state value indicates a boot in-progress state and the second boot state value indicates a boot success state.
7. The non-transitory medium of embodiment 6, wherein the repeating of A), B), and C) automatically terminates upon the elapsing of a time quantum.
8. The non-transitory medium of embodiment 7, wherein the time quantum is the estimated maximum time for an operating system to boot on the virtual machine.
9. The non-transitory medium of embodiment 7, wherein the elapsing of the time quantum indicates that the virtual machine is in a boot error state.
10. The non-transitory medium of embodiment 9, additionally comprising instructions to:
electronically capture, when the virtual machine is in a boot error state, a screenshot image file representing the virtual machine display output;
perform, on the screenshot image file representing the virtual machine display output of the booting virtual machine in a boot error state, automated optical character recognition in order to determine a boot error message;
generate an error report including the determined boot error message; and
transmit the error report to an administrator user as an indication of an unsuccessful backup image verification.

11. The non-transitory medium of embodiment 1, wherein the virtual machine is in communication with a virtual data store.

12. The non-transitory medium of embodiment 11, wherein the virtual data store content comprises a bootable operating system.

13. The non-transitory medium of embodiment 11, wherein the virtual data store content comprises the content of a backup image file.

14. The non-transitory medium of embodiment 13, wherein the backup image file is a representation of the block-level data stored on a source computer block storage device, wherein the source computer block storage device previously underwent a backup procedure in order to generate the backup image file.

15. The non-transitory medium of embodiment 13, additionally comprising instruction to:
provide the virtual data store to the hypervisor as a startup boot disk for the virtual machine.

Additional embodiments of the CRV may include:

1. A processor-implemented method of determining a server machine state utilizing register values, comprising:
determining that a server is in a first state and a configuration identifier;
querying, via a processor, a data store for a register conditional statement associated with the configuration identifier;
determining a current CPU register value set of the server;
evaluating the register conditional statement using the determined register value set; and
determining that the server has reached a second state.

2. The method of embodiment 1, additionally comprising:
requesting from the server a current display output screenshot; and
receiving the requested screenshot.

3. The method of embodiment 2, additionally comprising logging a boot status message.

4. The method of embodiment 3, wherein the boot status message is a successful boot message.

5. The method of embodiment 3, wherein the boot status message is a boot failure message.

6. The method of embodiment 5, additionally comprising:
performing an optical character recognition procedure on the received screenshot; and
determining an error message text associated with the boot status failure.

7. The method of embodiment 1, wherein the first state represents the server in a booting state and the second state represents the server in an operating system loaded success state.

8. The method of embodiment 1, wherein the first state represents the server in a booting state and the second state represents the server in an operating system loaded failure state.

9. The method of embodiment 1, wherein the first state represents the server in a state where a first application is not running and the second state represents the server in a state where the first application is successfully running.

10. The method of embodiment 1, wherein the first state represents the server in a state where a first device driver is not loaded and the second state represents the server in a state where the first device driver is loaded.

11. The method of embodiment 10 wherein the device driver is a computer peripheral driver.

12. The method of embodiment 11 wherein the computer peripheral is a hard drive.

Additional embodiments of the CRV may include:

1. A server machine state determination using register values apparatus, comprising:
a memory; and
a processor disposed in communication with said memory, and configured to issue a plurality of processing instructions stored in the memory, wherein the processor issues instructions to:
determine that a server is in a first state and a configuration identifier;
query, via a processor, a data store for a register conditional statement associated with the configuration identifier;
determine a current CPU register value set of the server;
evaluate the register conditional statement using the determined register value set; and
determine that the server has reached a second state.

2. The apparatus of embodiment 1, additionally comprising instructions to:
request from the server a current display output screenshot; and
receive the requested screenshot.

3. The apparatus of embodiment 2, additionally comprising instructions to log a boot status message.

4. The apparatus of embodiment 3, wherein the boot status message is a successful boot message.

5. The apparatus of embodiment 3, wherein the boot status message is a boot failure message.

6. The apparatus of embodiment 5, additionally comprising instructions to:
perform an optical character recognition procedure on the received screenshot; and
determine an error message text associated with the boot status failure.

7. The apparatus of embodiment 1, wherein the first state represents the server in a booting state and the second state represents the server in an operating system loaded success state.

8. The apparatus of embodiment 1, wherein the first state represents the server in a booting state and the second state represents the server in an operating system loaded failure state.

9. The apparatus of embodiment 1, wherein the first state represents the server in a state where a first application is not running and the second state represents the server in a state where the first application is successfully running.

10. The apparatus of embodiment 1, wherein the first state represents the server in a state where a first device driver is not loaded and the second state represents the server in a state where the first device driver is loaded.

11. The apparatus of embodiment 10 wherein the device driver is a computer peripheral driver.

12. The apparatus of embodiment 11 wherein the computer peripheral is a hard drive.

Additional embodiments of the CRV may include:

1. A non-transitory medium storing instructions to:
determine that a server is in a first state and a configuration identifier;
query, via a processor, a data store for a register conditional statement associated with the configuration identifier;
determine a current CPU register value set of the server;

evaluate the register conditional statement using the determined register value set; and
determine that the server has reached a second state.

2. A server machine state determination using register values apparatus, comprising:
   a memory; and
   a processor disposed in communication with said memory, and configured to issue a plurality of processing instructions stored in the memory, wherein the processor issues instructions to:
   determine a configuration identifier;
   query, via a processor, a data store for a register conditional statement associated with the configuration identifier;
   determine a current CPU register value set of a server;
   evaluate the register conditional statement using the determined register value set; and
   determine that an application has loaded or is executing on the server.

3. A server machine state determination using register values apparatus, comprising:
   a memory; and
   a processor disposed in communication with said memory, and configured to issue a plurality of processing instructions stored in the memory, wherein the processor issues instructions to:
   determine a configuration identifier;
   query, via a processor, a data store for a register conditional statement associated with the configuration identifier;
   determine a current CPU register value set of a server;
   evaluate the register conditional statement using the determined register value set; and
   determine that a device driver has loaded on the server.

4. A server machine state determination using register values apparatus, comprising:
   a memory; and
   a processor disposed in communication with said memory, and configured to issue a plurality of processing instructions stored in the memory, wherein the processor issues instructions to:
   determine a configuration identifier;
   query, via a processor, a data store for a register conditional statement associated with the configuration identifier;
   determine a current CPU register value set of a server;
   evaluate the register conditional statement using the determined register value set; and
   determine that the server is running an operating system that has been compromised by malware.

5. A server machine state determination using register values apparatus, comprising:
   a memory; and
   a processor disposed in communication with said memory, and configured to issue a plurality of processing instructions stored in the memory, wherein the processor issues instructions to:
   determine a configuration identifier and a capability set;
   query, via a processor, a data store for a register conditional statement associated with the configuration identifier;
   determine a current CPU register value set of a server;
   evaluate the register conditional statement using the determined register value set; and
   determine that the server has a capability set using the evaluated register conditional statement.

Additional CRV Configurations

In order to address various issues and advance the art, the entirety of this application for CRV (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CRV individual and/or enterprise user, database configuration and/or relational model, data type, data transmission and/or network framework, syntax structure, and/or the like, various embodiments of the CRV, may be implemented that enable a great deal of flexibility and customization as described herein.

The invention claimed is:

1. A method for verifying a status of an operating system running on a virtual machine, the method comprising:
obtaining, by a server, a plurality of virtual central processing unit (CPU) register values associated with at least one virtual CPU register of a virtual CPU on a hypervisor, the hypervisor providing virtualization services to the virtual machine;
determining, based at least in part on the plurality of virtual CPU register values, the status of the operating system; and
transmitting a message indicating the status of the operating system;
wherein:
obtaining the plurality of virtual CPU register values comprises obtaining the plurality of virtual CPU register values in a time-ordered sequence, and
determining the status of the operating system is based at least in part on the time-ordered sequence.

2. The method of claim 1, wherein determining the status of the operating system comprises:
estimating an entropy of the at least one virtual CPU register based at least in part on the plurality of virtual CPU register values, and
determining the status of the operating system is based at least in part on the entropy of the at least one virtual CPU register.

3. The method of claim 1, wherein:
determining the status of the operating system comprises determining that the operating system of the virtual machine has booted successfully.

4. The method of claim 3, wherein determining the status of the operating system comprises:
determining if an application is running on the virtual machine.

5. The method of claim 1, wherein determining the status of the operating system comprises:
determining that the operating system is booting, and
checking the status of the operating system after a predetermined period of time in response to determining that the operating system is booting.

6. The method of claim 1, wherein determining the status of the operating system comprises:
determining that the operating system has booted unsuccessfully.

7. The method of claim 1, the method further comprising:
acquiring a representation of a display output of the virtual machine so as to verify the status of the operating system.

8. The method of claim 7, further comprising:
automatically recognizing text in the display output of the virtual machine;
generating a report based at least in part on the text; and
transmitting the report to an administrator user as an indication of the status of the operating system.

9. An apparatus for verifying a status of an operating system of a virtual machine, the apparatus comprising:
a memory to store processor-executable instructions; and
at least one processor, operably coupled to the memory, to execute the processor executable instructions,
wherein, upon execution of the processor-executable instructions by the at least one processor, the apparatus:
obtains a plurality of virtual central processing unit (CPU) register values associated with at least one virtual CPU register of a virtual CPU on a hypervisor, the hypervisor providing virtualization services to the virtual machine;
determines, based at least in part on the plurality of virtual CPU register values, the status of the operating system; and
transmits a message indicating the status of the operating system,
wherein, upon execution of the processor-executable instructions by the at least one processor, the apparatus:
obtains the plurality of virtual CPU register values in a time-ordered sequence, and
determines the status of the operating system based at least in part on the time-ordered sequence.

10. The apparatus of claim 9, wherein, upon execution of the processor-executable instructions by the at least one processor, the apparatus:
estimates an entropy of the at least one virtual CPU register based at least in part on the plurality of virtual CPU register values, and
determines the status of the operating system based at least in part on the entropy of the at least one virtual CPU register.

11. The apparatus of claim 9, wherein, upon execution of the processor-executable instructions by the at least one processor, the apparatus:
determines that the operating system has booted successfully, and
acquires a representation of a display output of the virtual machine, the representation indicating successful booting of the virtual machine.

12. The apparatus of claim 11, wherein, upon execution of the processor-executable instructions by the at least one processor, the apparatus:
determines if an application is running on the virtual machine.

13. The apparatus of claim 9, wherein, upon execution of the processor-executable instructions by the at least one processor, the apparatus:
determines that the operating system is booting, and
checks the status of the operating system of the virtual machine after a predetermined period of time in response to determining that the operating system is booting.

14. The apparatus of claim 9, wherein, upon execution of the processor-executable instructions by the at least one processor, the apparatus:
determines that the operating system has booted unsuccessfully.

15. The apparatus of claim 9, wherein, upon execution of the processor-executable instructions by the at least one processor, the apparatus:
acquires a representation of a display output of the virtual machine.

16. The apparatus of claim 15, upon execution of the processor-executable instructions by the at least one processor, the apparatus:
automatically recognizes text in the display output of the virtual machine;
generates a report indicative of the text; and
transmits the report to an administrator user as an indication of the status of the operating system.

17. A method for verifying a status of an operating system of a virtual machine via a hypervisor providing a virtual central processing unit (CPU) to the virtual machine, the method comprising:

obtaining, by a server, a plurality of time-ordered virtual CPU register values associated with at least one virtual CPU register of the virtual CPU on the hypervisor;
determining, based at least in part on the plurality of time-ordered virtual CPU register values, a boot state value of the operating system of the virtual machine, the boot state value indicating that the operating system of the virtual machine (i) is still booting, (ii) has booted successfully, or (iii) has booted unsuccessfully; and
transmitting a message indicating the boot state value of the operating system of the virtual machine if the boot state value indicates that the operating system of the virtual machine has booted successfully or has booted unsuccessfully.

18. The method of claim 17, further comprising:
acquiring a representation of a display output of the virtual machine; and
if the operating system of the virtual machine has booted unsuccessfully, determining an error message based at least in part on the representation of the display output of the virtual machine.

19. An apparatus for verifying a status of an operating system of a virtual machine via a hypervisor providing a virtual central processing unit (CPU) to the virtual machine, the apparatus comprising:
a memory to store processor-executable instructions; and
at least one processor, operably coupled to the memory, to execute the processor executable instructions, wherein, upon execution of the processor-executable instructions by the at least one processor, the apparatus:
obtains a plurality of time-ordered virtual CPU register values associated with at least one virtual CPU register of the virtual CPU on the hypervisor;
determines based at least in part on the plurality of time-ordered virtual CPU register values, a boot state value of the operating system of the virtual machine, the boot state value indicating that the operating system of the virtual machine (i) is still booting, (ii) has booted successfully, or (iii) has booted unsuccessfully; and
transmits a message indicating the boot state value of the operating system of the virtual machine if the boot state value indicates that the operating system of the virtual machine has booted successfully or has booted unsuccessfully.

20. The apparatus of claim 19, wherein, upon execution of the processor-executable instructions by the at least one processor, the apparatus:
acquires a representation of a display output of the virtual machine; and
determines an error message based at least in part on the representation of the display output of the virtual machine, when the operating system of the virtual machine has booted unsuccessfully.

21. A method for verifying a status of an operating system running on a virtual machine, the method comprising:
obtaining, by a server, a plurality of virtual central processing unit (CPU) register values associated with at least one virtual CPU register of a virtual CPU on a hypervisor, the hypervisor providing virtualization services to the virtual machine;
determining, based at least in part on the plurality of virtual CPU register values, the status of the operating system; and
transmitting a message indicating the status of the operating system,
wherein determining the status of the operating system comprises:
estimating an entropy of the at least one virtual CPU register based at least in part on the plurality of virtual CPU register values, and
determining the status of the operating system is based at least in part on the entropy of the at least one virtual CPU register.

22. The method of claim 21, wherein:
determining the status of the operating system comprises determining that the operating system of the virtual machine has booted successfully, and
the method further comprises acquiring a representation of a display output of the virtual machine, the representation indicating successful booting of the virtual machine.

23. The method of claim 22, wherein determining the status of the operating system comprises:
determining if an application is running on the virtual machine.

24. The method of claim 21, wherein determining the status of the operating system comprises:
determining that the operating system is booting, and
checking the status of the operating system after a predetermined period of time in response to determining that the operating system is booting.

25. The method of claim 21, wherein determining the status of the operating system comprises:
determining that the operating system has booted unsuccessfully.

26. The method of claim 21, the method further comprising:
acquiring a representation of a display output of the virtual machine so as to verify the status of the operating system.

27. The method of claim 26, further comprising:
automatically recognizing text in the display output of the virtual machine;
generating a report based at least in part on the text; and
transmitting the report to an administrator user as an indication of the status of the operating system.

28. An apparatus for verifying a status of an operating system of a virtual machine, the apparatus comprising:
a memory to store processor-executable instructions; and
at least one processor, operably coupled to the memory, to execute the processor executable instructions,
wherein, upon execution of the processor-executable instructions by the at least one processor, the apparatus:
obtains a plurality of virtual central processing unit (CPU) register values associated with at least one virtual CPU register of a virtual CPU on a hypervisor, the hypervisor providing virtualization services to the virtual machine;
determines, based at least in part on the plurality of virtual CPU register values, the status of the operating system; and
transmits a message indicating the status of the operating system,
wherein, upon execution of the processor-executable instructions by the at least one processor, the apparatus:
estimates an entropy of the at least one virtual CPU register based at least in part on the plurality of virtual CPU register values, and
determines the status of the operating system based at least in part on the entropy of the at least one virtual CPU register.

29. The apparatus of claim 28, wherein, upon execution of the processor-executable instructions by the at least one processor, the apparatus:
  determines that the operating system has booted successfully, and
  acquires a representation of a display output of the virtual machine, the representation indicating successful booting of the virtual machine.

30. The apparatus of claim 29, wherein, upon execution of the processor-executable instructions by the at least one processor, the apparatus:
  determines if an application is running on the virtual machine.

31. The apparatus of claim 28, wherein, upon execution of the processor-executable instructions by the at least one processor, the apparatus:
  determines that the operating system is booting, and
  checks the status of the operating system of the virtual machine after a predetermined period of time in response to determining that the operating system is booting.

32. The apparatus of claim 28, wherein, upon execution of the processor-executable instructions by the at least one processor, the apparatus:
  determines that the operating system has booted unsuccessfully.

33. The apparatus of claim 28, wherein, upon execution of the processor-executable instructions by the at least one processor, the apparatus:
  acquires a representation of a display output of the virtual machine.

34. The apparatus of claim 33, upon execution of the processor-executable instructions by the at least one processor, the apparatus:
  automatically recognizes text in the display output of the virtual machine;
  generates a report indicative of the text; and
  transmits the report to an administrator user as an indication of the status of the operating system.

35. A method for verifying a status of an operating system running on a virtual machine, the method comprising:
  obtaining, by a server, a plurality of virtual central processing unit (CPU) register values associated with at least one virtual CPU register of a virtual CPU on a hypervisor, the hypervisor providing virtualization services to the virtual machine;
  determining, based at least in part on the plurality of virtual CPU register values, the status of the operating system; and
  transmitting a message indicating the status of the operating system,
  wherein:
  determining the status of the operating system comprises determining that the operating system of the virtual machine has booted successfully, and
  wherein determining the status of the operating system comprises:
  determining if an application is running on the virtual machine.

36. The method of claim 35, wherein determining the status of the operating system comprises:
  determining that the operating system is booting, and
  checking the status of the operating system after a predetermined period of time in response to determining that the operating system is booting.

37. The method of claim 35, wherein determining the status of the operating system comprises:
  determining that the operating system has booted unsuccessfully.

38. The method of claim 35, the method further comprising acquiring a representation of a display output of the virtual machine.

39. The method of claim 38, further comprising:
  automatically recognizing text in the display output of the virtual machine;
  generating a report based at least in part on the text; and
  transmitting the report to an administrator user as an indication of the status of the operating system.

40. An apparatus for verifying a status of an operating system of a virtual machine, the apparatus comprising:
  a memory to store processor-executable instructions; and
  at least one processor, operably coupled to the memory, to execute the processor executable instructions,
  wherein, upon execution of the processor-executable instructions by the at least one processor, the apparatus:
  obtains a plurality of virtual central processing unit (CPU) register values associated with at least one virtual CPU register of a virtual CPU on a hypervisor, the hypervisor providing virtualization services to the virtual machine;
  determines, based at least in part on the plurality of virtual CPU register values, the status of the operating system; and
  transmits a message indicating the status of the operating system,
  wherein, upon execution of the processor-executable instructions by the at least one processor, the apparatus:
  determines that the operating system has booted successfully,
  determines if an application is running on the virtual machine.

41. The apparatus of claim 40 wherein, upon execution of the processor-executable instructions by the at least one processor, the apparatus:
  determines that the operating system is booting, and
  checks the status of the operating system of the virtual machine after a predetermined period of time in response to determining that the operating system is booting.

42. The apparatus of claim 40, wherein, upon execution of the processor-executable instructions by the at least one processor, the apparatus:
  determines that the operating system has booted unsuccessfully.

43. The apparatus of claim 40, wherein, upon execution of the processor-executable instructions by the at least one processor, the apparatus:
  acquires a representation of a display output of the virtual machine.

44. The apparatus of claim 43, upon execution of the processor-executable instructions by the at least one processor, the apparatus:
  automatically recognizes text in the display output of the virtual machine;
  generates a report indicative of the text; and
  transmits the report to an administrator user as an indication of the status of the operating system.

45. A method for verifying a status of an operating system running on a virtual machine, the method comprising:
  obtaining, by a server, a plurality of virtual central processing unit (CPU) register values associated with at least one virtual CPU register of a virtual CPU on a hypervisor, the hypervisor providing virtualization services to the virtual machine;

determining, based at least in part on the plurality of virtual CPU register values, the status of the operating system; and transmitting a message indicating the status of the operating system, wherein determining the status of the operating system comprises:

determining that the operating system is booting, and checking the status of the operating system after a predetermined period of time in response to determining that the operating system is booting.

46. The method of claim 45, wherein:

determining the status of the operating system comprises determining that the operating system of the virtual machine has booted successfully, and the method further comprises acquiring a representation of a display output of the virtual machine, the representation indicating successful booting of the virtual machine.

47. The method of claim 45, wherein determining the status of the operating system comprises:

determining that the operating system has booted unsuccessfully.

48. The method of claim 45, the method further comprising acquiring a representation of a display output of the virtual machine.

49. The method of claim 48, further comprising:

automatically recognizing text in the display output of the virtual machine;

generating a report based at least in part on the text; and transmitting the report to an administrator user as an indication of the status of the operating system.

50. An apparatus for verifying a status of an operating system of a virtual machine, the apparatus comprising:

a memory to store processor-executable instructions; and at least one processor, operably coupled to the memory, to execute the processor executable instructions, wherein, upon execution of the processor-executable instructions by the at least one processor, the apparatus:

obtains a plurality of virtual central processing unit (CPU) register values associated with at least one virtual CPU register of a virtual CPU on a hypervisor, the hypervisor providing virtualization services to the virtual machine;

determines, based at least in part on the plurality of virtual CPU register values, the status of the operating system; and transmits a message indicating the status of the operating system, wherein, upon execution of the processor-executable instructions by the at least one processor, the apparatus:

determines that the operating system is booting, and checks the status of the operating system of the virtual machine after a predetermined period of time in response to determining that the operating system is booting.

51. The apparatus of claim 50, wherein, upon execution of the processor-executable instructions by the at least one processor, the apparatus:

determines that the operating system has booted successfully, and acquires a representation of a display output of the virtual machine, the representation indicating successful booting of the virtual machine.

52. The apparatus of claim 50, wherein, upon execution of the processor-executable instructions by the at least one processor, the apparatus:

determines that the operating system has booted unsuccessfully.

53. The apparatus of claim 50 wherein, upon execution of the processor-executable instructions by the at least one processor, the apparatus:

acquires a representation of a display output of the virtual machine.

54. The apparatus of claim 53, upon execution of the processor-executable instructions by the at least one processor, the apparatus:

automatically recognizes text in the display output of the virtual machine;

generates a report indicative of the text; and transmits the report to an administrator user as an indication of the status of the operating system.

55. A method for verifying a status of an operating system running on a virtual machine, the method comprising:

obtaining, by a server, a plurality of virtual central processing unit (CPU) register values associated with at least one virtual CPU register of a virtual CPU on a hypervisor, the hypervisor providing virtualization services to the virtual machine;

determining, based at least in part on the plurality of virtual CPU register values, the status of the operating system; and transmitting a message indicating the status of the operating system, wherein determining the status of the operating system comprises:

determining that the operating system has booted unsuccessfully.

56. The method of claim 55, wherein:

determining the status of the operating system comprises determining that the operating system of the virtual machine has booted successfully, and the method further comprises acquiring a representation of a display output of the virtual machine, the representation indicating successful booting of the virtual machine.

57. The method of claim 55, the method further comprising acquiring a representation of a display output of the virtual machine.

58. The method of claim 57, further comprising:

automatically recognizing text in the display output of the virtual machine;

generating a report based at least in part on the text; and transmitting the report to an administrator user as an indication of the status of the operating system.

59. An apparatus for verifying a status of an operating system of a virtual machine, the apparatus comprising:

a memory to store processor-executable instructions; and at least one processor, operably coupled to the memory, to execute the processor executable instructions, wherein, upon execution of the processor-executable instructions by the at least one processor, the apparatus:

obtains a plurality of virtual central processing unit (CPU) register values associated with at least one virtual CPU register of a virtual CPU on a hypervisor, the hypervisor providing virtualization services to the virtual machine;

determines, based at least in part on the plurality of virtual CPU register values, the status of the operating system; and transmits a message indicating the status of the operating system, wherein, upon execution of the processor-executable instructions by the at least one processor, the apparatus:

determines that the operating system has booted unsuccessfully.

60. The apparatus of claim 59, wherein, upon execution of the processor-executable instructions by the at least one processor, the apparatus:
   determines that the operating system has booted successfully, and
   acquires a representation of a display output of the virtual machine, the representation indicating successful booting of the virtual machine.

61. The apparatus of claim 59, wherein, upon execution of the processor-executable instructions by the at least one processor, the apparatus:
   acquires a representation of a display output of the virtual machine.

62. The apparatus of claim 61, upon execution of the processor-executable instructions by the at least one processor, the apparatus:
   automatically recognizes text in the display output of the virtual machine;
   generates a report indicative of the text; and
   transmits the report to an administrator user as an indication of the status of the operating system.

63. A method for verifying a status of an operating system running on a virtual machine, the method comprising:
   obtaining, by a server, a plurality of virtual central processing unit (CPU) register values associated with at least one virtual CPU register of a virtual CPU on a hypervisor, the hypervisor providing virtualization services to the virtual machine;
   determining, based at least in part on the plurality of virtual CPU register values, the status of the operating system;
   transmitting a message indicating the status of the operating system; and
   acquiring a representation of a display output of the virtual machine.

64. The method of claim 63, wherein:
   determining the status of the operating system comprises determining that the operating system of the virtual machine has booted successfully, and
   the representation of the display output of the virtual machine indicates successful booting of the virtual machine.

65. The method of claim 63, further comprising:
   automatically recognizing text in the display output of the virtual machine;
   generating a report based at least in part on the text; and
   transmitting the report to an administrator user as an indication of the status of the operating system.

66. An apparatus for verifying a status of an operating system of a virtual machine, the apparatus comprising:
   a memory to store processor-executable instructions; and
   at least one processor, operably coupled to the memory, to execute the processor executable instructions,
   wherein, upon execution of the processor-executable instructions by the at least one processor, the apparatus:
   obtains a plurality of virtual central processing unit (CPU) register values associated with at least one virtual CPU register of a virtual CPU on a hypervisor, the hypervisor providing virtualization services to the virtual machine;
   determines, based at least in part on the plurality of virtual CPU register values, the status of the operating system; and
   transmits a message indicating the status of the operating system,
   wherein, upon execution of the processor-executable instructions by the at least one processor, the apparatus:
   acquires a representation of a display output of the virtual machine.

67. The apparatus of claim 66, wherein, upon execution of the processor-executable instructions by the at least one processor, the apparatus:
   determines that the operating system has booted successfully, and
   wherein the display output of the virtual machine indicates successful booting of the virtual machine.

68. The apparatus of claim 66, upon execution of the processor-executable instructions by the at least one processor, the apparatus:
   automatically recognizes text in the display output of the virtual machine;
   generates a report indicative of the text; and
   transmits the report to an administrator user as an indication of the status of the operating system.

* * * * *